United States Patent
Bittar et al.

(10) Patent No.: US 10,358,909 B2
(45) Date of Patent: *Jul. 23, 2019

(54) INTERWELL TOMOGRAPHY METHODS AND SYSTEMS EMPLOYING A CASING SEGMENT WITH AT LEAST ONE TRANSMISSION CROSSOVER ARRANGEMENT

(71) Applicant: Halliburton Energy Services, Inc., Houston, TX (US)

(72) Inventors: Michael S. Bittar, Houston, TX (US); Clive D. Menezes, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/648,615

(22) PCT Filed: Apr. 23, 2015

(86) PCT No.: PCT/US2015/027374
§ 371 (c)(1),
(2) Date: May 29, 2015

(87) PCT Pub. No.: WO2015/167933
PCT Pub. Date: Nov. 5, 2015

(65) Prior Publication Data
US 2016/0258274 A1    Sep. 8, 2016

Related U.S. Application Data

(60) Provisional application No. 61/987,455, filed on May 1, 2014.

(51) Int. Cl.
E21B 7/04    (2006.01)
E21B 33/14    (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
None
See application file for complete search history.

(56) References Cited

U.S. PATENT DOCUMENTS

| 4,739,325 A | 4/1988 | MacLeod |
| 4,914,637 A | 4/1990 | Goodsman |

(Continued)

FOREIGN PATENT DOCUMENTS

| CN | 101421483 A | 4/2009 |
| CN | 103038444 A | 4/2013 |

(Continued)

OTHER PUBLICATIONS

"INFICOMM—Reflective Wireless Communications System", LALP-05-049, (Sep. 2006), 1 pg.

(Continued)

*Primary Examiner* — Douglas X Rodriguez
(74) *Attorney, Agent, or Firm* — Gilliam IP PLLC

(57) ABSTRACT

An interwell tomography method includes casing a first borehole with a casing tubular having at least one transmission crossover arrangement, each transmission crossover arrangement having an adapter in communication with a coil antenna that encircles an exterior of the casing tubular. The method also includes deploying, inside the casing tubular, a conductive path that extends from a surface interface to the at least one transmission crossover arrangement. The method also includes providing a set of one or more antennas in a second borehole. The method also includes obtaining electromagnetic (EM) measurements for interwell tomography using the at least one transmission crossover (Continued)

arrangement and the set of one or more antennas, where said obtaining involves conveying data or power between the at least one transmission crossover arrangement and the surface interface via the conductive path.

28 Claims, 11 Drawing Sheets

(51) Int. Cl.
| | |
|---|---|
| E21B 47/022 | (2012.01) |
| E21B 49/00 | (2006.01) |
| E21B 47/01 | (2012.01) |
| E21B 47/12 | (2012.01) |
| G01V 3/28 | (2006.01) |
| G01V 3/38 | (2006.01) |
| E21B 43/24 | (2006.01) |
| E21B 47/024 | (2006.01) |

(52) U.S. Cl.
CPC ............ *E21B 47/01* (2013.01); *E21B 47/122* (2013.01); *E21B 49/00* (2013.01); *G01V 3/28* (2013.01); *E21B 43/2406* (2013.01); *E21B 47/024* (2013.01); *G01V 3/38* (2013.01)

(56) References Cited

U.S. PATENT DOCUMENTS

| | | | |
|---|---|---|---|
| 4,949,045 | A | 8/1990 | Clark et al. |
| 5,050,675 | A | 9/1991 | Upchurch |
| 5,064,006 | A | 11/1991 | Waters et al. |
| 5,168,942 | A | 12/1992 | Wydrinski |
| 5,230,387 | A | 7/1993 | Waters et al. |
| 5,372,208 | A | 12/1994 | Mefferd |
| 5,455,573 | A | 10/1995 | Delatorre |
| 5,589,775 | A | 12/1996 | Kuckes |
| 6,102,137 | A | 8/2000 | Ward et al. |
| 6,294,917 | B1 * | 9/2001 | Nichols .................... G01V 3/28 |
| | | | 324/339 |
| 6,302,203 | B1 | 10/2001 | Rayssiguier et al. |
| 6,434,372 | B1 | 8/2002 | Neagley et al. |
| 6,515,592 | B1 | 2/2003 | Babour et al. |
| 6,684,952 | B2 | 2/2004 | Brockman et al. |
| 6,691,779 | B1 | 2/2004 | Sezginer et al. |
| 6,727,827 | B1 * | 4/2004 | Edwards ............... E21B 47/122 |
| | | | 324/339 |
| 6,788,065 | B1 | 9/2004 | Homan et al. |
| 7,183,777 | B2 | 2/2007 | Bristow et al. |
| 8,141,631 | B2 | 3/2012 | Chouzenoux et al. |
| 8,749,243 | B2 | 6/2014 | Bittar et al. |
| 8,917,094 | B2 | 12/2014 | Bittar et al. |
| 9,008,970 | B2 | 4/2015 | Donderici et al. |
| 2001/0035288 | A1 | 11/2001 | Brockman et al. |
| 2002/0000808 | A1 | 1/2002 | Nichols |
| 2002/0020533 | A1 | 2/2002 | Tubel |
| 2002/0079899 | A1 | 6/2002 | Frey et al. |
| 2003/0205083 | A1 | 11/2003 | Tubel et al. |
| 2004/0000910 | A1 | 1/2004 | Tryggvason |
| 2004/0065439 | A1 | 4/2004 | Tubel et al. |
| 2004/0149434 | A1 | 8/2004 | Frey et al. |
| 2004/0163822 | A1 | 8/2004 | Zhang et al. |
| 2005/0024060 | A1 | 2/2005 | Bittar |
| 2006/0124354 | A1 | 6/2006 | Witte |
| 2007/0216415 | A1 | 9/2007 | Clark et al. |
| 2007/0278008 | A1 | 12/2007 | Kuckes et al. |
| 2008/0246485 | A1 | 10/2008 | Hibbs et al. |
| 2008/0308271 | A1 | 12/2008 | Chouzenoux et al. |
| 2009/0151950 | A1 | 6/2009 | Patel |
| 2009/0174409 | A1 | 7/2009 | Coates et al. |
| 2009/0236144 | A1 | 9/2009 | Todd et al. |
| 2011/0006773 | A1 | 1/2011 | Bittar |
| 2011/0011580 | A1 | 1/2011 | Clark et al. |
| 2011/0068794 | A1 | 3/2011 | Coates |
| 2011/0128003 | A1 | 6/2011 | Thompson et al. |
| 2012/0017673 | A1 | 1/2012 | Godager |
| 2012/0024050 | A1 | 2/2012 | Godager |
| 2012/0090827 | A1 | 4/2012 | Sugiura |
| 2012/0193092 | A1 | 8/2012 | Qu et al. |
| 2012/0274477 | A1 | 11/2012 | Prammer |
| 2013/0048269 | A1 | 2/2013 | Tarayre et al. |
| 2013/0087321 | A1 | 4/2013 | Bartko et al. |
| 2013/0110402 | A1 | 5/2013 | Godager |
| 2013/0239673 | A1 * | 9/2013 | Garcia-Osuna ......... E21B 17/16 |
| | | | 73/152.46 |
| 2013/0341092 | A1 | 12/2013 | Hay et al. |
| 2014/0191879 | A1 | 7/2014 | Bittar et al. |
| 2015/0122489 | A1 * | 5/2015 | Wood ..................... E21B 43/14 |
| | | | 166/250.01 |
| 2016/0258277 | A1 | 9/2016 | Bittar et al. |
| 2016/0258283 | A1 | 9/2016 | Bittar et al. |
| 2016/0258284 | A1 | 9/2016 | Bittar et al. |

FOREIGN PATENT DOCUMENTS

| | | | |
|---|---|---|---|
| EA | 04215 | B1 | 4/2004 |
| EA | 11835 | B1 | 6/2009 |
| EA | 012821 | B1 | 12/2009 |
| EP | 0972909 | A2 | 1/2000 |
| EP | 1 609 947 | | 12/2005 |
| EP | 1609947 | A1 | 12/2005 |
| RU | 2239041 | C2 | 10/2004 |
| RU | 2262598 | C2 | 10/2005 |
| RU | 2263783 | C2 | 11/2005 |
| RU | 2374441 | C2 | 11/2009 |
| WO | 2001098632 | A1 | 12/2001 |
| WO | 2011002461 | A1 | 1/2011 |
| WO | 2011141173 | A2 | 11/2011 |
| WO | 2012005737 | A1 | 1/2012 |
| WO | WO 2012067611 | A1 * | 5/2012 ............... E21B 7/04 |
| WO | 2013052049 | A1 | 4/2013 |
| WO | 2015/167936 | | 5/2015 |
| WO | 2015/167934 | | 11/2015 |
| WO | 2015/167935 | | 11/2015 |

OTHER PUBLICATIONS

"PCT Application as Filed", Appl No. PCT/US2015/027378, "Casing Segment Having at Least One Transmission Crossover Arrangement," filed Apr. 23, 2015, 39 pgs.
"PCT Application as Filed", Appl No. PCT/US2015/027377, "Multilateral Production Control Methods and Systems Employing a Casing Segment With at Least One Transmission Crossover Arrangement," filed Apr. 23, 2015, 40 pgs.
"PCT Application as Filed", Appl No. PCT/US2015/027376, "Guided Drilling Methods and Systems Employing a Casing Segment With at Least One Transmission Crossover Arrangement," filed Apr. 23, 2015, 39 pgs.
"PCT Application as Filed", Appl No. PCT/US2015/027374, "Interwell Tomography Methods and Systems Employing a Casing Segment With at Least One Transmission Crossover Arrangement," filed Apr. 23, 2015, 40 pgs.
PCT International Search Report and Written Opinion, dated Jul. 21, 2015, Appl No. PCT/US2015/027377, "Multilateral Production Controls Methods and Systems Employing a Casing Segment With at Least One Transmission Crossover Arrangement," Filed Apr. 23, 2015.
PCT International Search Report and Written Opinion, dated Jul. 23, 2015, Appl No. PCT/US2015/027378, "Casing Segment Having at Least One Transmission Crossover Arrangement With an Inductive Adapter," Filed Apr. 23, 2015.
US Non-Final Office Action, dated Apr. 24, 2017, U.S. Appl. No. 14/648,625, "Casing Segment Having at Least One Transmission Crossover Arrangement," Filed May 29, 2015.
AU Patent Examination Report No. 1, dated Mar. 17, 2015, Appl No. 2013281227, "Downhole All-Optical Magnetometer Sensor," filed Mar. 19, 2013.
EP Application Serial No. 15786605.4, Extended European Search Report; dated Dec. 5, 2017, 6 pages.

(56) References Cited

OTHER PUBLICATIONS

Int'l Application No. PCT/US2015/027374, International Preliminary Report on Patentability, dated Nov. 1, 2016, 12 pgs.
CA Application Serial No. 2,946,743, 1st Examiner's Letter, dated Oct. 12, 2017, 3 pgs.
SG Application Serial No. 2017/3700480316S, Search Report and 1st Written Opinion, dated Nov. 9, 2017, 7 pgs.
Chinese Application Serial No. 201580021987.8; First Office Action Including English Translation; dated Nov. 23, 2018, 20 pages.
CA Application Serial No. 2947143, Office Action, dated Jul. 26, 2018, 4 pages.
CA Application Serial No. 2,946,857, Second Examiner's Letter; dated Feb. 20, 2018, 4 pages.
CN Application Serial No. 201580023582.8, First Office Action, dated Jul. 2, 2018, 8 pages.
EP Application Serial No. 15 78 6193, Extended European Search Report, dated Nov. 3, 2017, 6 pages.
EP Application Serial No. 15786211.1, Communication Pursuant to Article 94(3) EPC, dated Sep. 10, 2018, 5 pages.
EP Application Serial No. 15786211.1, Extended European Search Report, dated Nov. 16, 2017, 9 pages.
GCC Application Serial No. 2015-29319, Examination Report, dated May 15, 2018, 4 pages.
GCC Application Serial No. 2015-29318, Second Examination Report, dated Apr. 18, 2018, 3 pages.
RU Application Serial No. 2016142515, Second Office Action, dated Apr. 3, 2018, 8 pages.
RU Application Serial No. 2016142610, Office Action, dated Nov. 10, 2017, 5 pages.
RU Application Serial No. 2016142609; Notification on Results of Estimation of Patentability of Invention, dated Mar. 1, 2018, 6 pages.
RU Application Serial No. 2016142609, Search Report, dated Nov. 3, 2017, 3 pages.
SG Application Serial No. 11201608899Y, Examination Report, dated Oct. 17, 2018, 4 pages.
SG Application Serial No. 11201608940T, Search Report, dated Jan. 4, 2018, 3 pages.
SG Application Serial No. 11201608940T, Written Opinion, dated Jan. 4, 2018, 7 pages.
RU Application Serial No. 2016142609; Decision to Grant; dated Sep. 14, 2018, 12 pages.
RU Application Serial No. 2016142610; Decision to Grant; dated Oct. 4, 2018, 13 pages.
SG Application Serial No. 2017/3715026566S, Search Report, dated Nov. 15, 2017, 2 pages.
GCC Application Serial No. 2015-29321; Second Examination Report; dated Jun. 6, 2018, 3 pages.
SG Application Serial No. 11201608942P, SG Search Report, dated Jan. 4, 2018, 3 pages.
CA Application Serial No. 2,947,008, First Examiner's Letter, dated Sep. 19, 2017, 4 pages.
CA Application Serial No. 2,947,008, Second Office Action, dated May 14, 2018, 4 pages.
GCC Application Serial No. 2015-29320, Second Examination Report, dated Mar. 19, 2018, 4 pages.
GCC Application Serial No. 2015-29321, First Examination Report; dated Jan. 15, 2018, 4 pages.
GCC Application Serial No. 2015-29320, Third Examination Report, dated Aug. 3, 2018, 4 pages.
GCC Application Serial No. 2015-29318, First Examination Report, dated Jan. 11, 2018, 4 pages.
GCC Application Serial No. 2015-29320, First Examination Report, dated Jan. 25, 2018, 4 pages.
PCT Application Serial No. PCT/US2015/027376, International Search Report, dated Aug. 4, 2015, 5 pages.
RU Application Serial No. 2016142610, Examination Report, dated Mar. 7, 2018, 5 Pages.
SG Application Serial No. 2017/3715026566S, First Written Opinion, dated Nov. 15, 2017, 5 pages.
SG Application Serial No. 11201608940T, Written Search Opinion, dated Nov. 15, 2018, 5 pages.
MX Application Serial No. MX/a/2016/014353, Office Action, dated Aug. 24, 2018, 5 pages.
CA Application Serial No. 2947143, Office Action 1, dated Nov. 6, 2017, 5 pages.
CA Application Serial No. 2,946,857, Examiner's Letter, dated Aug. 6, 2018, 6 pages.
SG Application Serial No. 11201608942P, Second Written Opinion, dated Nov. 21, 2018, 6 pages.
SG Application Serial No. 11201608942P, SG Written Opinion, dated Jan. 4, 2018, 7 pages.
RU Application Serial No. 2016142515, First Office Action, dated Dec. 4, 2017, 6 pages.
CA Application Serial No. 2,946,857, First Office Action, dated Jul. 12, 2017, 3 pages.
Canadian Application Serial No. 2,946,743; Second Examiner's Letter; dated Jun. 21, 2018, 5 pages.

\* cited by examiner

20

CASING SEGMENT

- TRANSMISSION CROSSOVER ARRANGEMENT
    - -> AT LEAST ONE EXTERAL COIL ANTENNA
        - ->CO-AXIAL
        - ->TILTED
        - ->MULTI-COMPONENT
    - -> AT LEAST ONE ADAPTER FOR ACCESS ALONG INTERIOR
        - ->INDUCTIVE COUPLER
        - ->ELECTRODE-BASED COUPLER
            - ->CAPACITIVE COUPLING
            - ->GALVANIC COUPLING
    - ->ENERGY STORAGE DEVICE
    - ->DATA STORAGE DEVICE
    - ->SENSORS
        - -INTERIOR SENSORS
        - -EXTERIOR SENSORS
    - ->CONTROL UNIT/CIRCUITRY
        - ->TRANSMISSION CONTROL
            - ->ADDRESSING SCHEME
            - ->MODULATION SCHEME
            - ->MULTIPLEXING
            - ->TIMING
            - ->POWER MANAGEMENT
        - ->RECEPTION CONTROL
            - ->ADDRESSING SCHEME
            - ->DEMODULATION SCHEME
            - ->DEMULTIPLEXING
    - ->NON-CONDUCTIVE WINDOWS IN CONDUCTIVE TUBULAR
    - ->RECESSES/COVERS INTEGRATED WITH CONDUCTIVE TUBULAR FOR TRANSMISSION CROSSOVER ARRANGEMENT COMPONENTS

FIG. 1

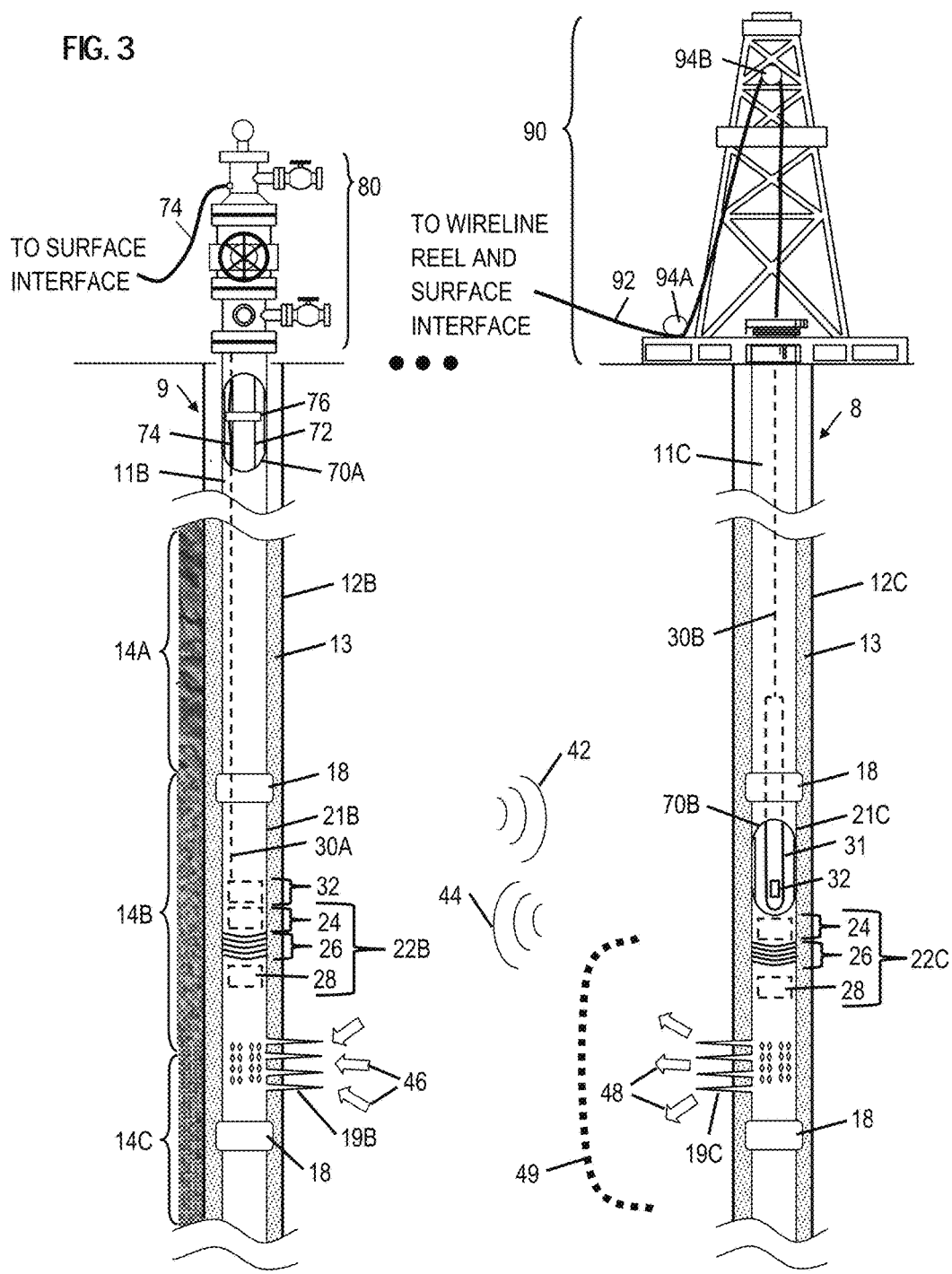

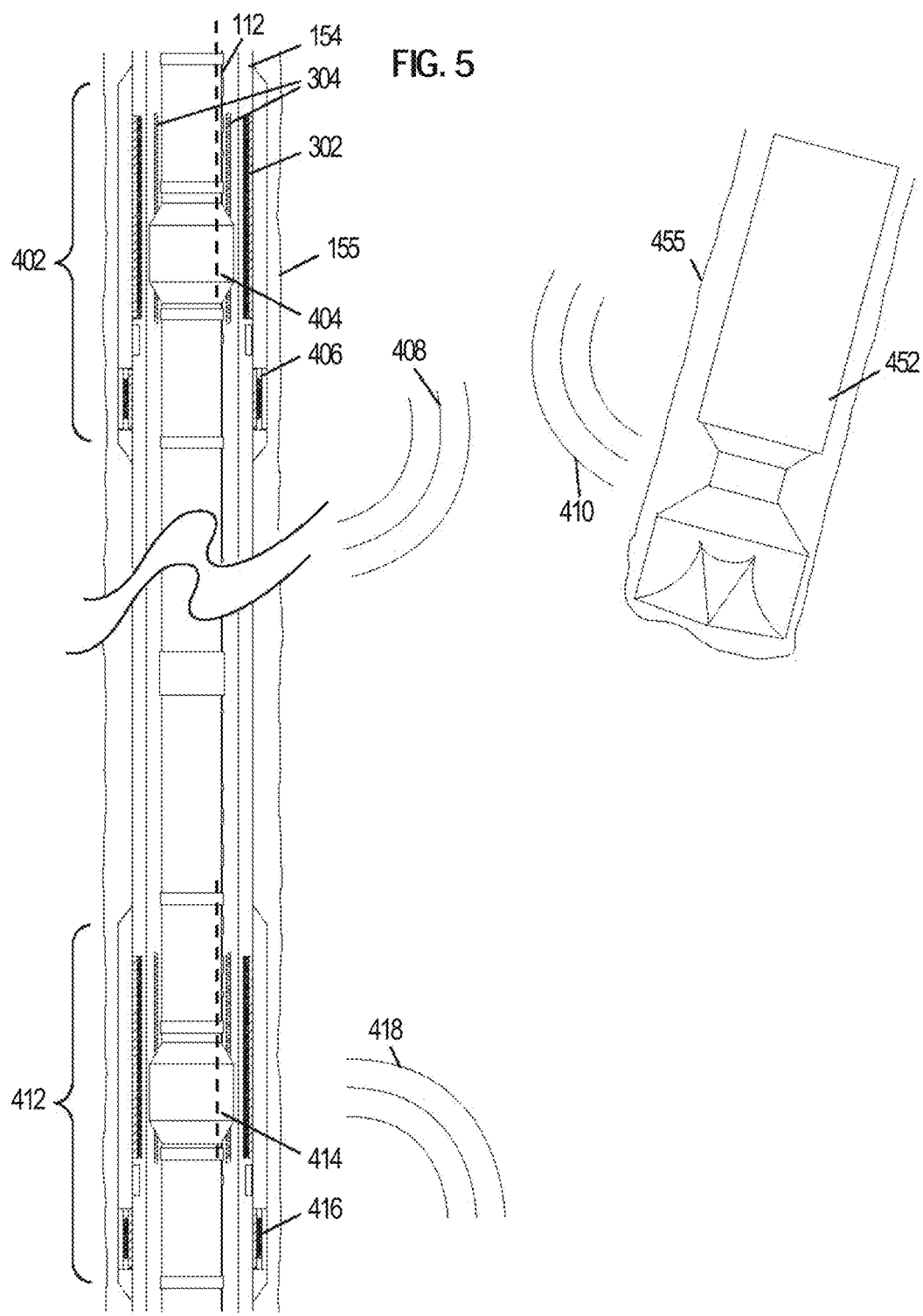

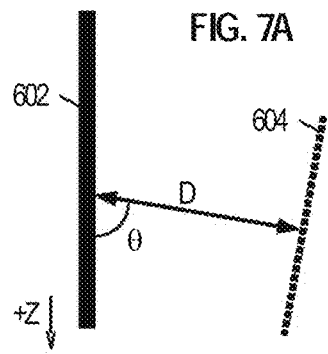
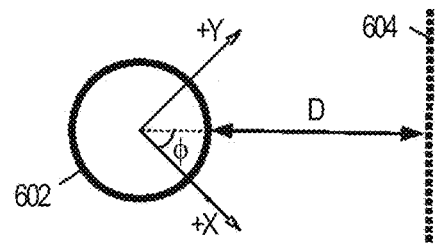
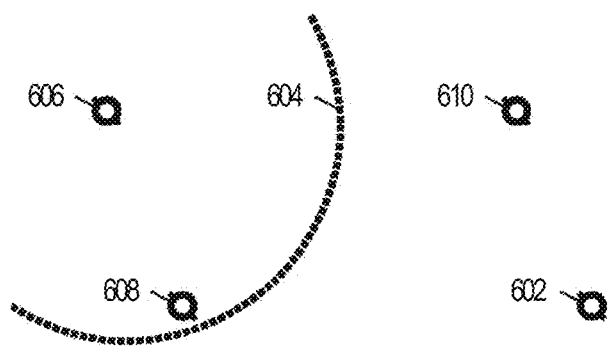
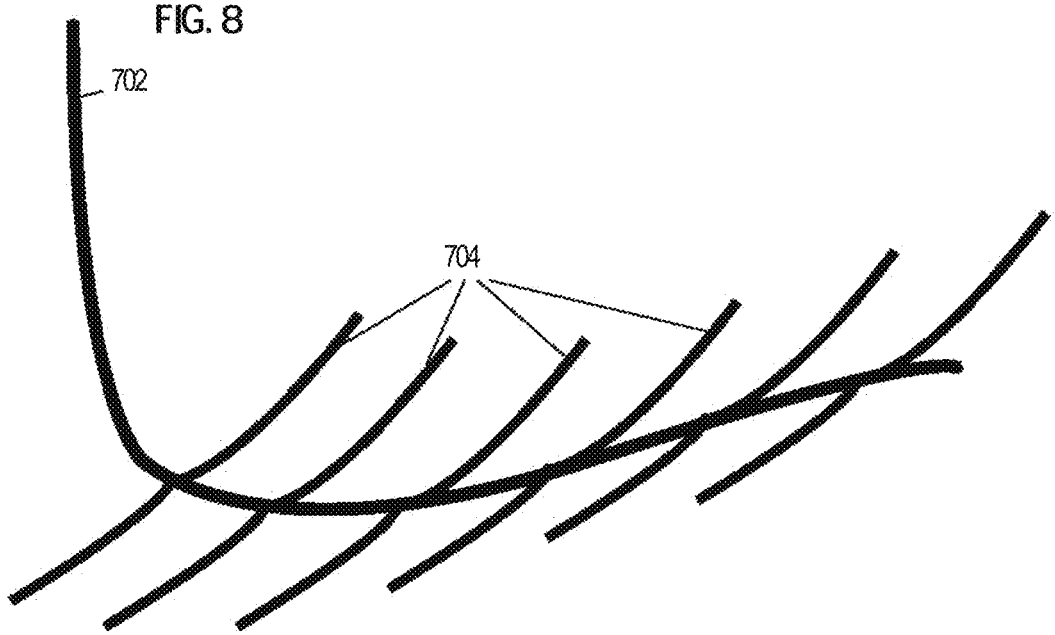

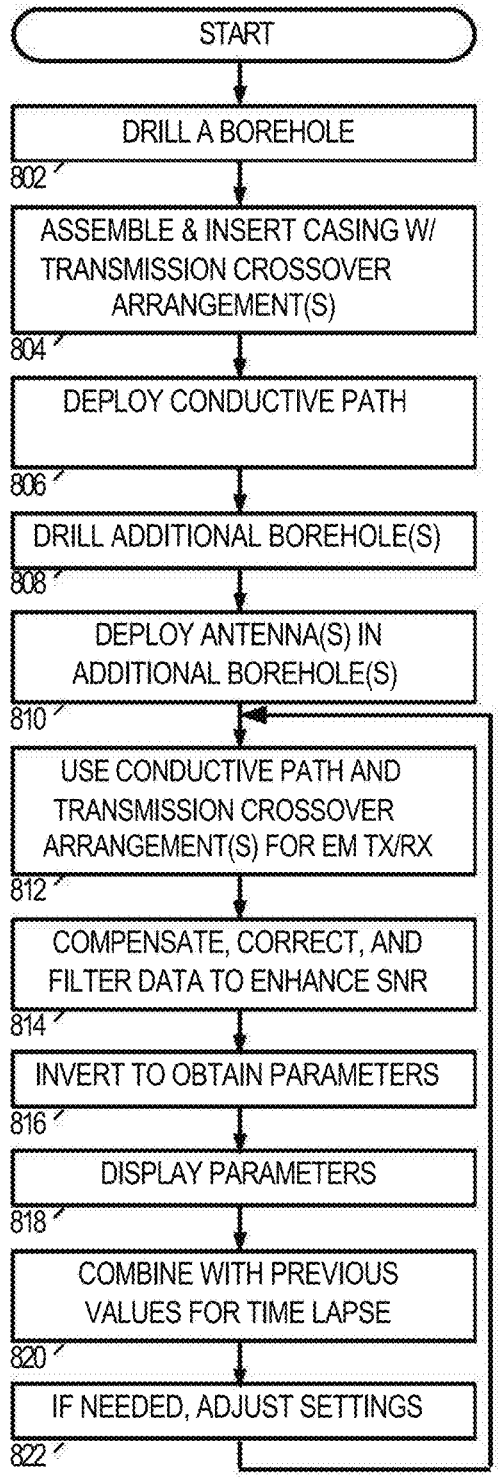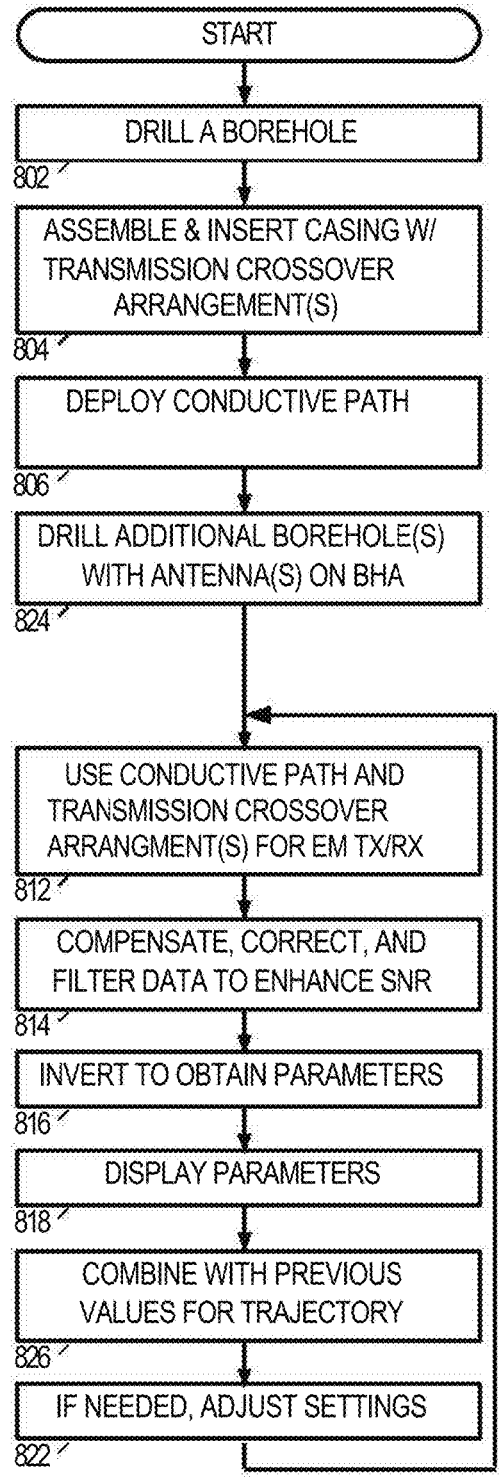

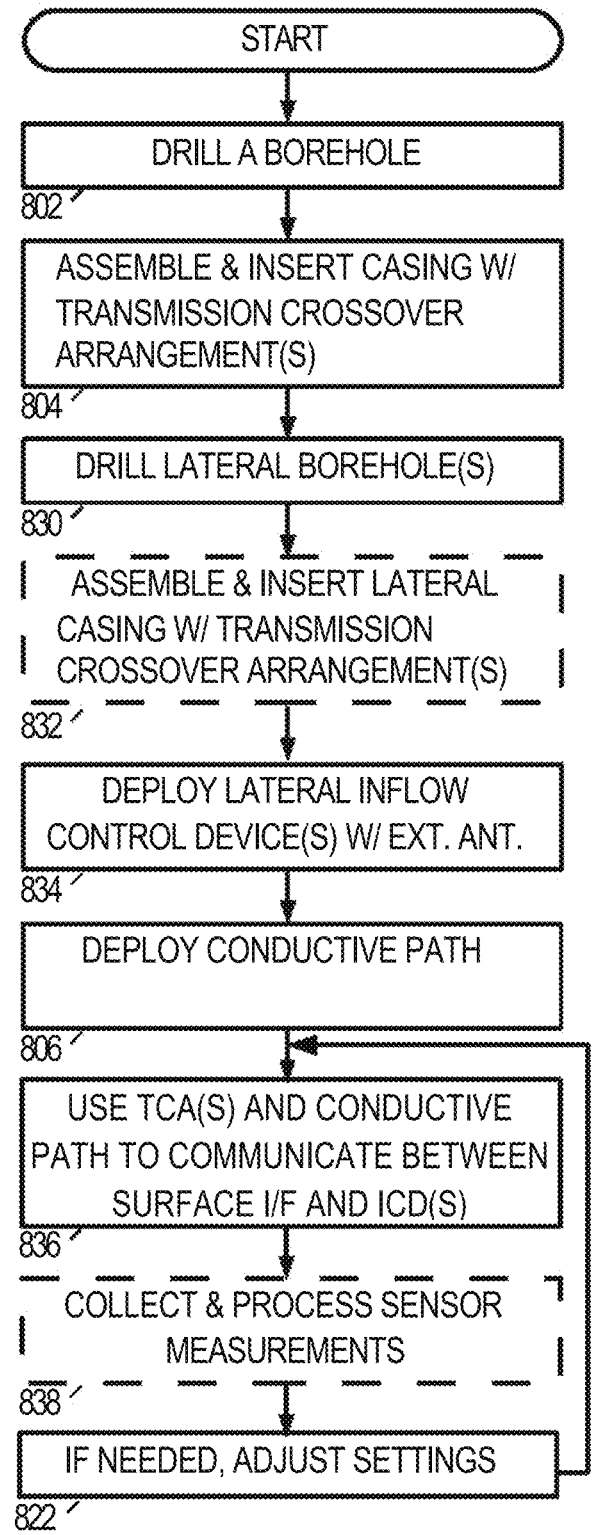

INTERWELL TOMOGRAPHY METHODS AND SYSTEMS EMPLOYING A CASING SEGMENT WITH AT LEAST ONE TRANSMISSION CROSSOVER ARRANGEMENT

CROSS-REFERENCE TO RELATED APPLICATIONS

The present application is a National Stage of International PCT Pat. App. PCT/US2015/027374 titled "Interwell Tomography Methods and Systems Employing a Casing Segment with at Least One Transmission Crossover Arrangement", filed Apr. 23, 2015 by Michael S. Bittar et al. which claims the benefit of U.S. Pat. App. 61/987,455, titled "Casing Coils For Interwell Tomograpy", filed May 1, 2014 by Michael S. Bittar et al. The above-noted applications are hereby incorporated herein by reference in their entirety.

BACKGROUND

Oilfield operating companies seek to maximize the profitability of their reservoirs. Typically, this goal can be stated in terms of maximizing the percentage of extracted hydrocarbons subject to certain cost constraints. A number of recovery techniques have been developed for improving hydrocarbon extraction. For example, many companies employ flooding techniques, injecting a gas or a fluid into a reservoir to displace the hydrocarbons and sweep them to a producing well. As another example, some heavy hydrocarbons are most effectively produced using a steam-assisted gravity drainage technique, where steam is employed to reduce the hydrocarbons' viscosity.

Such recovery techniques create a fluid front between the injected fluid and the fluid being displaced. The position of the fluid front is a key parameter for the control and optimization of these recovery techniques, yet it is usually difficult to track due to the absence of feasible and suitably effective monitoring systems and methods. Where the use of seismic surveys, monitoring wells and/or wireline logging tools is infeasible, operators may be forced to rely on computer simulations to estimate the position of the fluid front, with commensurately large uncertainties. Suboptimal operations related to inter-well spacing, inter-well monitoring, and/or multi-lateral production control increases the likelihood of premature breakthrough where one part of the fluid front reaches the producing well before the rest of the front has properly swept the reservoir volume. Such premature breakthrough creates a low-resistance path for the injected fluid to follow and deprives the rest of the system of the power it needs to function.

DESCRIPTION OF THE DRAWINGS

Accordingly, there are disclosed in the drawings and the following description a casing segment with at least one transmission crossover arrangement and related methods and systems for guided drilling, interwell tomography, and/or multi-lateral production control. In the drawings:

FIG. 1 is a block diagram showing features of an illustrative casing segment configuration involving at least one crossover transmission arrangement.

FIG. 3 is a schematic depiction of an interwell tomography system employing casing segments with transmission crossover arrangements.

FIG. 5 shows a guided drilling system employing casing segments with transmission crossover arrangements.

FIGS. 7A and 7B show illustrative geometrical inversion parameters.

FIG. 7C shows multi-well monitoring of a fluid front.

FIG. 8 shows an illustrative multilateral well configuration.

FIG. 9A is a flow diagram of an illustrative interwell tomography method.

FIG. 9B is a flow diagram of an illustrative guided drilling method.

FIG. 9C is a flow diagram of an illustrative multilateral control method.

Figure 2:
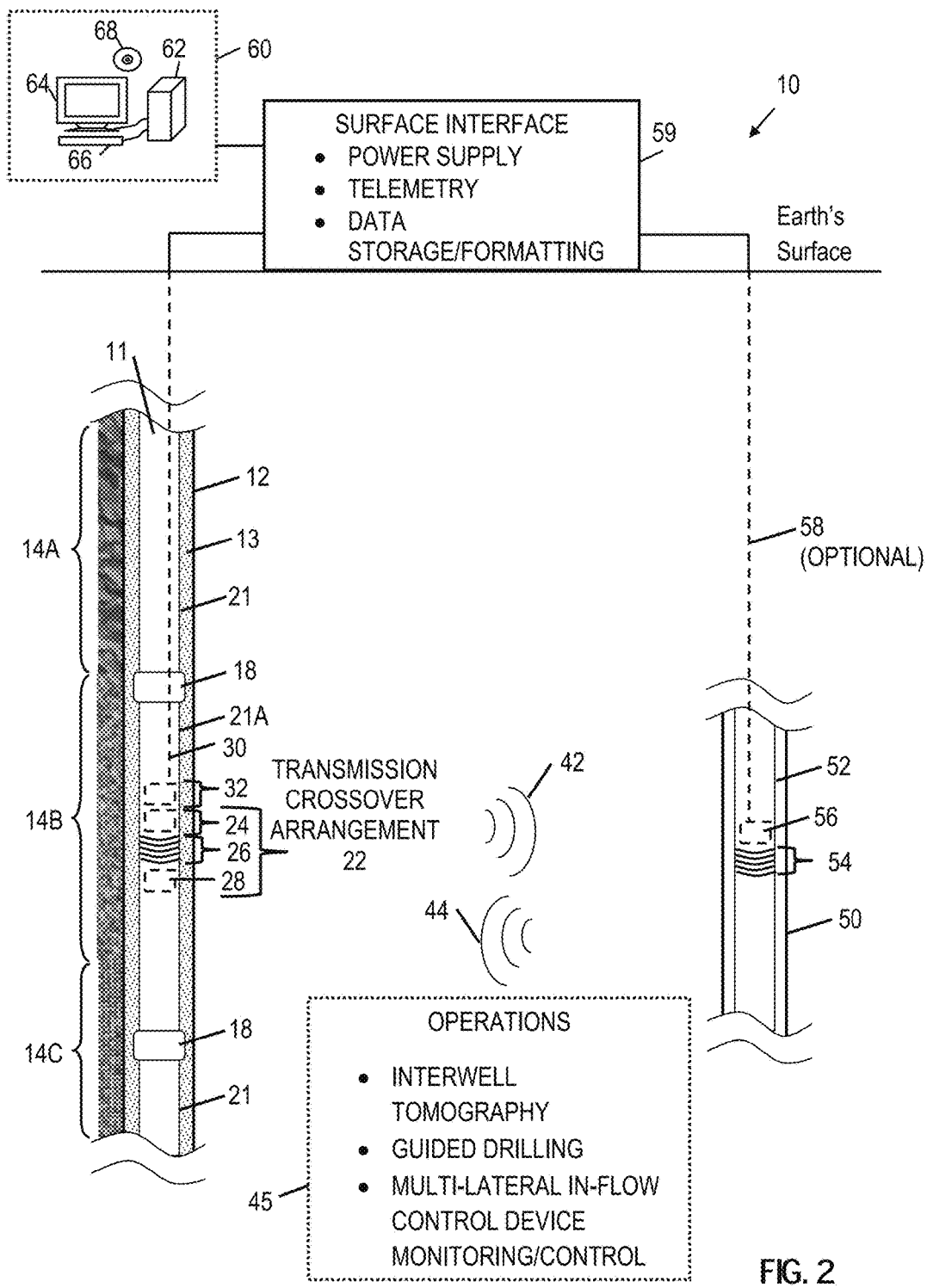
FIG. 2 is a schematic depiction of an illustrative system employing a casing segment with at least one transmission crossover arrangement.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are casing segment embodiments with at least one transmission crossover arrangement. As used herein, the term "casing segment" or "casing tubular" refer to any structure (e.g., a tubular) used to line the wall of any section of a borehole, either in a main borehole or in a lateral branch. Casing segments may vary with regard to material, thickness, inner diameter, outer diameter, grade, and/or end connectors, and various casing segment types are known in the industry such as conductor casing, surface casing, intermediate casing, production casing, liner, and liner tieback casing. Casing segments are often joined or coupled together to form a casing string that protects the integrity of an entire borehole or at least part of a borehole. While some casing strings extend to earth's surface, other casing strings (e.g., liners) hang from another casing string.

The term "coupled" or "coupled to" herein refers to a direct or indirect connection between two or more components. Without limitation, the direct or indirect connection may be mechanical, electrical, magnetic, and/or chemical in nature. For example, if a first component couples to a second component, that connection may be through a direct electrical connection, through an indirect electrical connection via other components and connections, through a direct physical connection, or through an indirect physical connection via other components and connections in various embodiments. Further, it should be appreciated that coupling two components may result in only one type of connection (mechanical, electrical, magnetic, or chemical) or in multiple types of connections (mechanical, electrical, magnetic, and/or chemical).

As used herein, the term "transmission crossover arrangement" corresponds to at least one coil antenna external to the casing tubular and in communication with an adapter. As an option, a control unit may be included with or assigned to each transmission crossover arrangement to support various operations involving controlled transmission, receipt, and/or storage of electromagnetic (EM) signals or sensor data. Thus, the phrase "in communication with" may refer to a direct coupling between the at least one coil antenna and the adapter, or an indirect coupling (e.g., control unit components may be positioned between the at least one coil antenna and the adapter). With an indirect coupling between the at least one coil antenna and the adapter, conveyance of power and/or communications between the at least one coil antenna, control unit components, and the adapter can be immediate or delayed as desired. In operation, each transmission crossover arrangement enables power or communications to be conveyed (immediately or in a delayed manner) from a respective casing segment's interior to its exterior or vice versa.

To enable downhole operations, a transmission crossover arrangement is permanently or temporarily coupled to a conductive path that extends to earth's surface. For example, the conductive path may couple to a transmission crossover arrangement's adapter at one end and to a surface interface at the other end. As used herein, the term "surface interface" corresponds to one or more components at earth's surface that provide power and/or telemetry for downhole operations. Example components of a surface interface include one or more power supplies, transmitter circuitry, receiver circuitry, data storage components, transducers, analog-to-digital converters, and digital-to-analog converters. The surface interface may be coupled to or includes a computer system that provides instructions for surface interface components, transmission crossover arrangements, and/or downhole tools.

In at least some embodiments, the adapter for a given transmission crossover arrangement corresponds to an inductive adapter that couples to a conductive path coil inductively, where the conductive path extends between an interior of the casing tubular and earth's surface (e.g., to a surface interface). In other embodiments, the adapter corresponds to an electrode-based adapter that couples to conductive path electrodes capacitively or galvanically, where the conductive path extends between the interior of the casing tubular and earth's surface. As an example, one or more of such conductive paths may be deployed downhole by attaching a cable to an inner tubular and lowering the inner tubular to a position at or near a transmission crossover arrangement's adapter. Alternatively, one or more of such conductive paths may be deployed downhole by lowering a wireline service tool to a position at or near a transmission crossover arrangement's adapter.

For inductive coupling, the conductive path includes an inductive coil that, when sufficiently close to the inductive adapter of a transmission crossover arrangement, enables power or communications to be conveyed between earth's surface and the respective transmission crossover arrangement. For electrode-based coupling, the conductive path includes one or more electrodes that, when galvanic or capacitive contact occurs between the conductive path's electrode(s) and an electrode-based adapter of a transmission crossover arrangement, enable power or communications to be conveyed between the conductive path and the transmission crossover arrangement. Such coupling between inductive coils or electrodes corresponding to a conductive path and a transmission crossover arrangement may be scaled as needed. Thus, it should be appreciated that each casing segment may include one transmission crossover arrangement or multiple transmission crossover arrangements. Further, a downhole casing string may include multiple casing segments that each employ at least one transmission crossover arrangement. Further, a conductive path may be arranged to couple to a single transmission crossover arrangement or to multiple transmission crossover arrangements at a time. Further, multiple conductive paths may be employed, where each conductive path may be permanently installed or moveable. If moveable, each conductive path may support coupling to one transmission crossover arrangement at a time or a set of transmission crossover arrangements at a time. Each transmission crossover arrangement that is coupled to a conductive path as described herein, regardless of whether such coupling is temporary or permanent, may be termed a transmission crossover unit or module. In other words, a transmission crossover unit or module includes a casing segment with a transmission crossover arrangement as well as inner conductive path components needed to convey power or communications to or from earth's surface.

Each transmission crossover arrangement may also include other features including a control unit with an energy storage device, a data storage device, interior sensors, exterior sensors, and/or control circuitry. Such features can facilitate transmitting or receiving signals, where multiple signals can be uniquely identified (e.g., using addressing, multiplexing, and/or modulation schemes). Further, interior or exterior sensor data can be useful for tracking downhole fluid properties and/or properties of the ambient environment (e.g., temperature, acoustic activity, seismic activity, etc.). With an energy storage device, a casing segment with at least one transmission crossover arrangement can perform signal transmission, signal reception, sensing, and data storage operations even if a conductive path to earth's surface is not currently available. When a conductive path temporarily couples to a given transmission crossover arrangement, stored data collected during ongoing or periodic operations (e.g., such operations may be performed before, during, or after temporary conductive path coupling) can be conveyed to earth's surface and/or an energy storage device can be recharged to enable ongoing or periodic operations even after the conductive path is no longer available.

As described herein, a casing segment employing at least one transmission crossover arrangement may be part of a system used to perform guided drilling operations, interwell tomography operations, and/or multi-lateral control operations. FIG. 1 is a block diagram showing features of an illustrative casing segment configuration 20 involving at least one transmission crossover arrangement. As shown, the casing segment configuration 20 includes a transmission crossover arrangement with at least one external coil antenna and at least one internal adapter. Options for the at least one external antenna include tilted antennas and multi-component antennas. Meanwhile, options for the at least one internal adapter include an inductive adapter and an electrode-based adapter. The electrode-based adapter may support capacitive coupling and/or galvanic coupling. If an inductive adapter is used, the corresponding inductive coil may be internal to and insulated from the casing segment. Alternatively, the inductive adapter may correspond to an inductive coil that wraps around an exterior of the casing segment or an exterior recess of the casing segment, where the casing segment includes nonconductive windows to allow electromagnetic energy to be transferred from a conductive path inside the casing segment to the inductive adapter. In some embodiments, transmission crossover arrangement components may be set in a recess of a casing tubular and/or covered with protective material.

Other features of the casing segment configuration 20 include an energy storage device, a data storage device, sensors, a control unit and/or control circuitry. In some embodiments, one or more of these other features are optionally employed to facilitate transmitting or receiving signals, where multiple signals can be uniquely identified (e.g., using addressing, multiplexing, and/or modulation schemes). Further, interior or exterior sensor data can be useful for tracking downhole fluid properties and/or properties of the ambient environment (e.g., temperature, acoustic activity, seismic activity, etc.). With an energy storage device, a casing segment with at least one transmission crossover arrangement can perform signal transmission, signal reception, sensing, and data storage operations even if a conductive path to earth's surface is not currently available. When a conductive path temporarily couples to a given transmission crossover arrangement, stored data collected during ongoing or periodic operations (e.g., such operations may be performed before, during, or after temporary conductive path coupling) can be conveyed to earth's surface and/or an energy storage device can be recharged to enable ongoing or periodic operations even after the conductive path is no longer available. An example energy storage device includes a rechargeable battery. An example data storage device includes a non-volatile memory. Example sensors include temperature sensors, pressure sensors, acoustic sensors, seismic sensors, and/or other sensors. In at least some embodiments, optical fibers are used for sensing ambient parameters such as temperature, pressure, or acoustic activity.

Further, an example control unit may correspond to a processor or other programmable logic that can execute stored instructions. As desired, new or updated instructions can be provided to the processor or other programmable logic. With the instructions, the control unit is able to employ addressing schemes, modulation schemes, demodulation schemes, multiplexing schemes, and/or demultiplexing schemes to enable unique identification of transmitted or received signals. Such signals may be conveyed between earth's surface and one or more transmission crossover arrangements, between different transmission crossover arrangements, and/or between one or more transmission crossover arrangements and downhole equipment (e.g., an in-flow control device as described herein). Example control circuitry includes drivers and receivers that facilitate signal transmission operations and signal reception operations.

In at least some embodiments, a casing segment with some or all of the features of configuration 20 is employed along a casing string to perform operations such as interwell tomography operations, guided drilling operations (ranging), multi-lateral in-flow control device (ICD) monitoring or control operations, and/or other operations. FIG. 2 is a schematic depiction of an illustrative system 10 employing a casing segment 21A with a transmission crossover arrangement 22. As represented in FIG. 2, the casing segment 21A is part of a casing string 11 deployed in a borehole 12 that extends through various formation layers 14A-14C. An annulus 13 is defined to be between the casing string 11 and the borehole 12. The well 12 can be drilled and cased using known techniques. In one embodiment, the casing string 11 may have multiple casing segments 21 connected together, for example, using couplers 18. Different casing string embodiments are possible, where the number and/or the characteristics of casing segments 21 may vary. Further, the manner in which casing segments 21 couple together to form a casing string 11 may vary as is known in the art. While the casing string 11 and casing segment 21A are shown to have a vertical orientation in FIG. 2, it should be appreciated that casing segments, such as segment 21A, could have another orientation. Further, multiple casing segments, each with its own transmission crossover arrangement 22, may be employed along a casing string such as casing string 11. In such case, the spacing between and/or orientation of different casing segments having a transmission crossover arrangement may be the same or may vary.

In accordance with at least some embodiments, the transmission crossover arrangement 22 of casing segment 21A includes adapter 24, coil antenna 26, and control unit 28. The adapter 24, for example, corresponds to an inductive adapter or electrode-based adapter that is accessible along an interior of casing segment 21A to enable coupling to a conductive path 30 that runs along the interior of the casing string 11. Further, the conductive path 30 may include a conductive path adapter 32 that is compatible with adapter 24. Together, the transmission crossover arrangement 22 of casing segment 21A and the conductive path adapter 32 may be considered to be a transmission crossover unit or module that is temporarily available or permanently deployed.

The coil antenna 26 may be used to send signals 42 to and/or receive signals 44 from a downhole tool 52 in another borehole 50. The downhole tool 52 may correspond to another casing segment with a transmission crossover arrangement, an in-flow control device (ICD), a wireline tool, logging-while-drilling (LWD) tool, a bottomhole assembly, or other downhole tool. Example operations (represented in operations block 45) involving the coil antenna 26 sending signals 42 to and/or receiving signals 44 from downhole tool 52 include interwell tomography, guided drilling, and/or multi-lateral ICD monitoring or control. To perform such operations, the downhole tool 52 may include an antenna 54 and control unit 56 (which may or may not be part of another transmission crossover arrangement). Further, in some embodiments, a conductive path 58 may be optionally provided to enable more direct conveyance of power/communications between earth's surface and the downhole tool 52. Alternatively, the downhole tool 52 sends signals 44 to and/or receives signals 42 from the transmission crossover arrangement 22 without having separate conductive path 58. In such case, power/communications between earth's surface and the downhole tool 52 is conveyed via the transmission crossover arrangement 22 and conductive path 30. Further, the transmission crossover arrangement 22 may perform the task of selecting or filtering information to be provided to earth's surface from the downhole tool 52, and/or of selecting or filtering information to be provided from earth's surface to the downhole tool 52.

The control unit 28 may include an energy storage device, a processing unit, a data storage device, sensors, and/or control circuitry. The function of the control unit 28 may vary for different embodiments. Further, in some embodiments, the control unit 28 may be omitted. Example features provided by the control unit include directing periodic or ongoing transmissions of signals 42 and/or directing periodic or ongoing reception of signals 44. Further, the control unit 28 may employ an addressing scheme, a multiplexing scheme, and/or a modulation scheme to enable unique identification of multiple signals 42 or 44 (note: there may be multiple transmission crossover arrangements 22 and/or multiple downhole tools 52 within range of each other). Such schemes may involve transmitter circuitry, receiver circuitry, a processing unit, and/or a data storage device with instructions executable by the processing unit. Further, interior or exterior sensors may track downhole fluid properties and/or properties of the ambient environment (e.g., temperature, acoustic activity, seismic activity, etc.). With an energy storage device, the control unit 28 can direct signal transmission, signal reception, sensing, and data storage operations even if a conductive path to earth's surface is not currently available. When a conductive path temporarily couples to the transmission crossover arrangement 22, the control unit 28 may direct the process of conveying stored data collected during ongoing or periodic operations (e.g., such operations may be performed before, during, or after a temporary conductive path coupling) to earth's surface and/or may direct recharging of the energy storage device. An example energy storage device includes a rechargeable battery. An example data storage device includes a non-volatile memory. Example sensors include temperature sensors, pressure sensors, acoustic sensors, seismic sensors, and/or other sensors. In at least some embodiments, optical fibers are used for sensing ambient parameters such as temperature, pressure, or acoustic activity.

At earth's surface, a surface interface 59 provides power and/or telemetry for downhole operations involving the transmission crossover arrangement 22. Example components for the surface interface 59 include one or more power supplies, transmitter circuitry, receiver circuitry, data storage components, transducers, analog-to-digital converters, digital-to-analog converters. The surface interface 59 may be coupled to or includes a computer system 60 that provides instructions for surface interface components, the transmission crossover arrangement 22, and/or downhole tool 52. Further, the computer system 60 may process information received from the transmission crossover arrangement 22 and/or the downhole tool 52. In different scenarios, the computer system 60 may direct the operations of and/or receive measurements from the transmission crossover arrangement 22 and/or the downhole tool 52. The computer system 60 may also display related information and/or control options to an operator. The interaction of the computer system 60 with the transmission crossover arrangement 22 and/or the downhole tool 52 may be automated and/or subject to user-input.

In at least some embodiments, the computer system 60 includes a processing unit 62 that displays logging/control options and/or results by executing software or instructions obtained from a local or remote non-transitory computer-readable medium 68. The computer system 60 also may include input device(s) 66 (e.g., a keyboard, mouse, touchpad, etc.) and output device(s) 64 (e.g., a monitor, printer, etc.). Such input device(s) 66 and/or output device(s) 64 provide a user interface that enables an operator to interact with components of the transmission crossover arrangement 22, the downhole tool 52, and/or software executed by the processing unit 62.

For interwell tomography, the information conveyed from computer system 60 to the transmission crossover arrangement 22 or downhole tool 52 may correspond to interwell tomography instructions or signals. Meanwhile, the information conveyed from the transmission crossover arrangement 22 or downhole tool 52 to the computer 60 may correspond to interwell tomography measurements or acknowledgment signals. For guided drilling, the information conveyed from the computer system 60 to the transmission crossover arrangement 22 or downhole tool 52 may correspond ranging or drilling instructions or signals. Meanwhile, the information conveyed from the transmission crossover arrangement 22 or downhole tool 52 to the computer system 60 may correspond to ranging or guided drilling measurements or acknowledgment signals. For multi-lateral monitoring/control operations, the information conveyed from the computer system 60 to the transmission crossover arrangement 22 or downhole tool 52 may correspond ICD instructions or interrogations. Meanwhile, the information conveyed from the transmission crossover arrangement 22 or downhole tool 52 to the computer 60 may correspond to ICD measurements or acknowledgment signals.

FIG. 3 is a schematic depiction of an interwell tomography system. In FIG. 3, the interwell tomography area corresponds to at least some of the downhole area or volume between injection well 8 and production well 9. Note: it should be appreciated that interwell tomography can be performed between the same well type or different well types (monitoring wells, production wells, injection wells) and that production wells can operate as injection wells and vice versa. In FIG. 3, the production well 8 includes a casing string 11B having a casing segment 21B with transmission crossover arrangement 22B. Similarly, injection well 9 includes a casing string 11C having a casing segment 21C with transmission crossover arrangement 22C. The casing strings 11B and 11C are deployed in boreholes 12B and 12C that pass through different formation layers 14A-14C of the earth. Along the casing strings 11B and 11C, respective perforations 19B and 19B enable fluid injection 48 by casing string 11C and fluid production 46 by casing string 11B.

In operation, the transmission crossover arrangements 22B and 22C are used to collect interwell tomography information that can be used to characterize at least some of the downhole area or volume between injection well 8 and production well 9 and/or to reduce the occurrence of premature breakthrough (where one part of the fluid front 49 reaches the producing well 9 before the rest of the front 49 has properly swept the reservoir volume). The specific features of transmission crossover arrangements 22B and 22C was previously described for the transmission crossover arrangements 22 of FIG. 2 and will not be repeated.

In FIG. 3, two different conductive path options 30A and 30B along the interiors of casing strings 11B and 11C are represented using cut-out views 70A and 70B. The conductive path 30A interior to casing string 11B corresponds at least in part to a cable 74 attached (e.g., using bands 76) to an inner tubular 72 (e.g., a production string) deployed within the casing string 11B. In at least some embodiments, the cable 74 and inner tubular 72 extend between earth's surface and the transmission crossover arrangement 22B, where a conductive path adapter 32 enables coupling between the conductive path 30A and the adapter 24 of transmission crossover arrangement 22B. The coupling may be inductive or electrode-based as described herein. Further, the cable 74 may exit a wellhead 80 at earth's surface and connect to a surface interface 84 to enable conveyance of power/communications between earth's surface and the transmission crossover arrangement 22B.

Meanwhile, the conductive path 30B interior to casing string 11C corresponds at least in part to a wireline service tool 31 that is lowered or raised within casing string 11C using wireline 92. Herein, the term "wireline", when not otherwise qualified, is used to refer to a flexible or stiff cable that can carry electrical current on an insulated conductor that may be armored with a wire braid or thin metal tubing having insufficient compressive strength for the cable to be pushed for any significant distance. In some cases, a stiff wireline may be rigid enough for pushing a tool along a deviated, horizontal, or ascending borehole. In practice, stiff wireline may take the form of a flexible cable strapped or otherwise attached to a tubular, though other embodiments are possible.

In at least some embodiments, the wireline 92 may extend from a reel (not shown) and is guided by wireline guides 94A, 94B of a rig or platform 90 at earth's surface. The wireline 92 may further extend to a surface interface (e.g., interface 84 or computer system 60) to enable conveyance of power/communications between earth's surface and transmission crossover arrangement 22C. When the wireline service tool 31 is at or near the transmission crossover arrangement 22C, a conductive path adapter 32 provided with the wireline service tool 31 enables coupling between the conductive path 30B and the adapter 24 of transmission crossover arrangement 22C. The coupling may be inductive or electrode-based as described herein.

Though FIG. 3 shows vertical wells, the interwell tomography principles described herein also apply to horizontal and deviated wells. They may also apply where the injected fluid does not act as a drive fluid. For example, in a steam-assisted gravity drainage (SAGD) operation, in an injection well circulates and injects steam into a surrounding formation. As the thermal energy from the steam reduces the viscosity of the heavy oil in the formation, the heavy oil (and steam condensate) is drawn downward by gravity to a producing well drilled parallel and from about 5-20 ft lower. In this manner, the steam forms an expanding "steam chamber" that delivers thermal energy to more and more heavy oil. The chamber primarily grows in an upward direction, but there is a front that gradually moves downward towards the producing well. Excessive injection rates will drive the front prematurely to the producing well, creating an unwanted flow path that severely reduces the operation's efficiency. Either or both of the wells may be equipped with external antenna modules to map the distribution of formation properties and thereby track the distance of the front. (The front is detectable because injected steam has different resistive and dielectric properties than the formation and the heavy oil.)

Often companies will drill additional wells in the field for the sole purpose of monitoring the distribution of reservoir fluids and predicting front arrivals at the producing wells. In the system of FIG. 3, additional wells and well interfaces may be included in the coordinated operation of the field and the interwell tomography system. The additional wells may be single-purpose wells (i.e., only for injection, production, or monitoring), or they may serve multiple purposes, some of which may change over time (e.g., changing from a producing well to an injection well or vice versa).

During interwell tomography operations, transmission crossover arrangements 22B and 22C may be used along or may be used in combination with other components such as spaced-apart electrodes that create or detect EM signals, wire coils that create or detect EM signals, and/or magnetometers or other EM sensors to detect EM signals. In at least some embodiments, different coil antennas 26 of the respective transmission crossover arrangements 22B and 22C transmit EM signals while other coil antennas 26 obtain responsive measurements. In some embodiments, it is contemplated that different coil antennas 26 of the transmission crossover arrangements 22B and 22C are suitable only for transmitting while others are suitable only for receiving. Meanwhile, in other embodiments, it is contemplated that different coil antennas 26 of the transmission crossover arrangements 22B and 22C can perform both transmitting and receiving. In at least some embodiments, coil antennas 26 of the transmission crossover arrangements 22B and 22C perform interwell tomography operations by transmitting or receiving arbitrary waveforms, including transient (e.g., pulse) waveforms, periodic waveforms, and harmonic waveforms. Further, coil antennas 26 of the transmission crossover arrangements 22B and 22C may perform interwell tomography operations by measuring natural EM fields including magnetotelluric and spontaneous potential fields. Without limitation, suitable EM signal frequencies for interwell tomography include the range from 1 Hz to 10 kHz. In this frequency range, the modules may be expected to detect signals at transducer spacings of up to about 200 feet, though of course this varies with transmitted signal strength and formation conductivity. Lower (below 1 Hz) signal frequencies may be suitable where magnetotelluric or spontaneous potential field monitoring is employed. Higher signal frequencies may also be suitable for some applications, including frequencies as high as 500 kHz, 2 MHz, or more.

In at least some embodiments, the surface interface 84 and/or a computer system (e.g., computer 60) obtains and processes EM measurement data, and provides a representative display of the information to a user. Without limitation, such computer systems can take different forms including a tablet computer, laptop computer, desktop computer, and virtual cloud computer. Whichever processor unit embodiment is employed includes software that configures the processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the transducer modules and inverts the measurements to obtain one or more parameters such as fluid front distance, direction, and orientation. Additional parameters may include a resistivity distribution and an estimated water saturation.

A computer system such as computer system 60 may further enable the user to adjust the configuration of the transducers, varying such parameters as firing rate of the transmitters, firing sequence of the transmitters, transmit amplitudes, transmit waveforms, transmit frequencies, receive filters, and demodulation techniques. In some contemplated system embodiments, an available computer system further enables the user to adjust injection and/or production rates to optimize production from the reservoir.

Figure 4A:
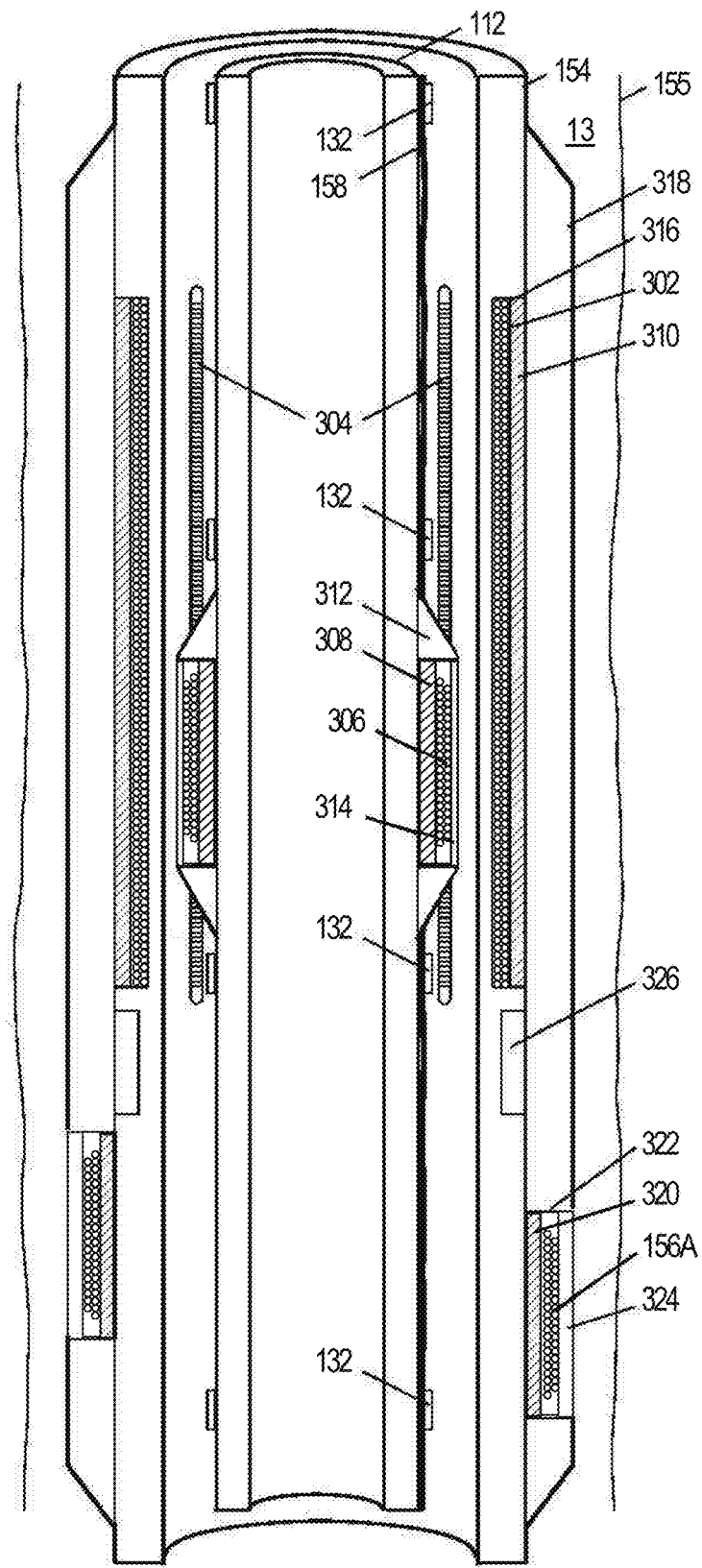
FIG. 4A is a cutaway view showing a downhole scenario involving a transmission crossover arrangement with an inductive adapter.

The interwell tomography scenario of FIG. 3 is just one example of how casing segments with at least one transmission crossover arrangement can be used. Further, it should be appreciated that different transmission crossover arrangement and conductive path options are possible. FIG. 4A is a cutaway view showing a downhole scenario involving a transmission crossover arrangement with an inductive adapter. In FIG. 4A, the transmission crossover arrangement includes an inductive adapter coil 302 and external coil antenna 156A. The inductive adapter coil 302 is wound coaxially over one or more windows 304 through the wall of the casing tubular 154. The illustrated windows 304 are longitudinal slots that may be filled with a nonconductive material. The windows 304 facilitate the passage of electromagnetic energy between the inductive adapter coil 302 and a conductive path coil 306.

The conductive path coil 306 forms part of a conductive path that extends between a surface interface and the inductive adapter coil 302. In FIG. 4A, the conductive path includes conductive path coil 306 and a cable 158 with one or more electrical conductors. In at least some embodiments, cable 158 is attached to an inner tubular 112 by straps 132. Further, the conductive path coil 306 encircles the inner tubular 112, and a layer of high-permeability material 308 may be placed between the inner tubular 112 and the conductive path coil 306 to reduce the attenuation that might otherwise be caused by the conductive inner tubular 112. (A similar high-permeability layer 310 may overlie the inductive adapter coil 302 to improve the inductive coupling between the inductive adapter coil 302 and the conductive path coil 306.) For protection, the conductive path coil 306 may be seated between annular bulkheads 312 or flanges, and sealed beneath a nonconductive cover 314. A resin or other filler material may be used to fill the gaps beneath the cover 314 to protect the conductive path coil 306 from various effects of the downhole environment including fluids at elevated temperature and pressures.

The nonconductive windows 304 and any gaps in recess 316 may also be filled with a resin or other filler material to protect the outer coil 302 from fluids at elevated temperatures and pressures. A sleeve 318 provides mechanical protection for the inductive adapter coil 302. Depending on the depth of recess 316 and the number and width of windows 304, it may be desirable to make sleeve 318 from steel or another structurally strong material to assure the structural integrity of the casing tubular. If structural integrity is not a concern, the sleeve may be a composite material.

To facilitate alignment of the conductive path coil 306 with the inductive adapter coil 302, the longitudinal dimension of the inductive adapter coil 302 and slots 304 may be on the order of one to three meters, whereas the longitudinal dimension of the conductive path coil 306 may be on the order of 20 to 40 centimeters.

The inductive adapter coil 302 of the transmission crossover arrangement is coupled to a set of one or more external coil antennas 156 (FIG. 4A shows only a single external antenna coil 156A). The external coil antenna(s) encircle the casing tubular 154 and they may be tilted to provide azimuthal sensitivity. A high-permeability layer 320 is positioned between the casing tubular 154 and the external coil antenna 156A to reduce attenuation that might otherwise be caused by the conductive material of the tubular. For mechanical protection, external coil antenna(s) such as antenna 156A may be seated in a recess 322 and surrounded by a nonconductive cover 324. Any gaps in the recess 322 may be filled with a resin or other nonconductive filler material.

In certain alternative embodiments where a greater degree of protection is desired for the conductive path coil 306 or the external coil antenna 156A, the nonconductive covers 314 or 324 may be supplemented or partially replaced with a series of steel bridges across the recess so long as there are windows of nonconductive material between the bridges to permit the passage of electromagnetic energy. The edges of the metal bridges should be generally perpendicular to the plane of the coil.

In some embodiments, the external coil antenna 156A is coupled in series with the inductive adapter coil 302 so that signals are directly communicated between the conductive path coil 306 and the external coil antenna 156A, whether such signals are being transmitted into the formation or received from the formation. In other embodiments, a control unit 326 mediates the communication. Control unit 326 may include a switch to multiplex the coupling of the inductive adapter coil 302 to selected ones of the external coil antennas. Further, control unit 326 may include a battery, capacitor, or other energy source, and a signal amplifier. The control unit 326 may additionally or alternatively include an analog-to-digital converter and a digital-to-analog converter to digitize and re-transmit signals in either direction. Control unit 326 may still further include a memory for buffering data and a programmable controller that responds to commands received via the inductive adapter coil 302 to provide stored data, to transmit signals on the external coil antenna, and/or to customize the usage of the external antennas.

Figure 4C:
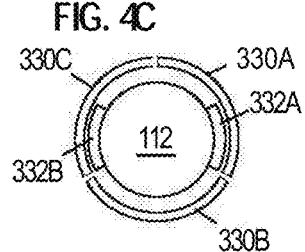
FIGS. 4C and 4D are cross-sectional views of alternative electrode coupling configurations.
Figure 4D:
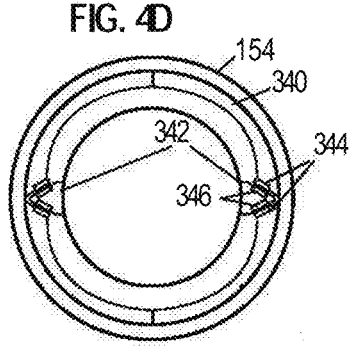
Figure 4B:
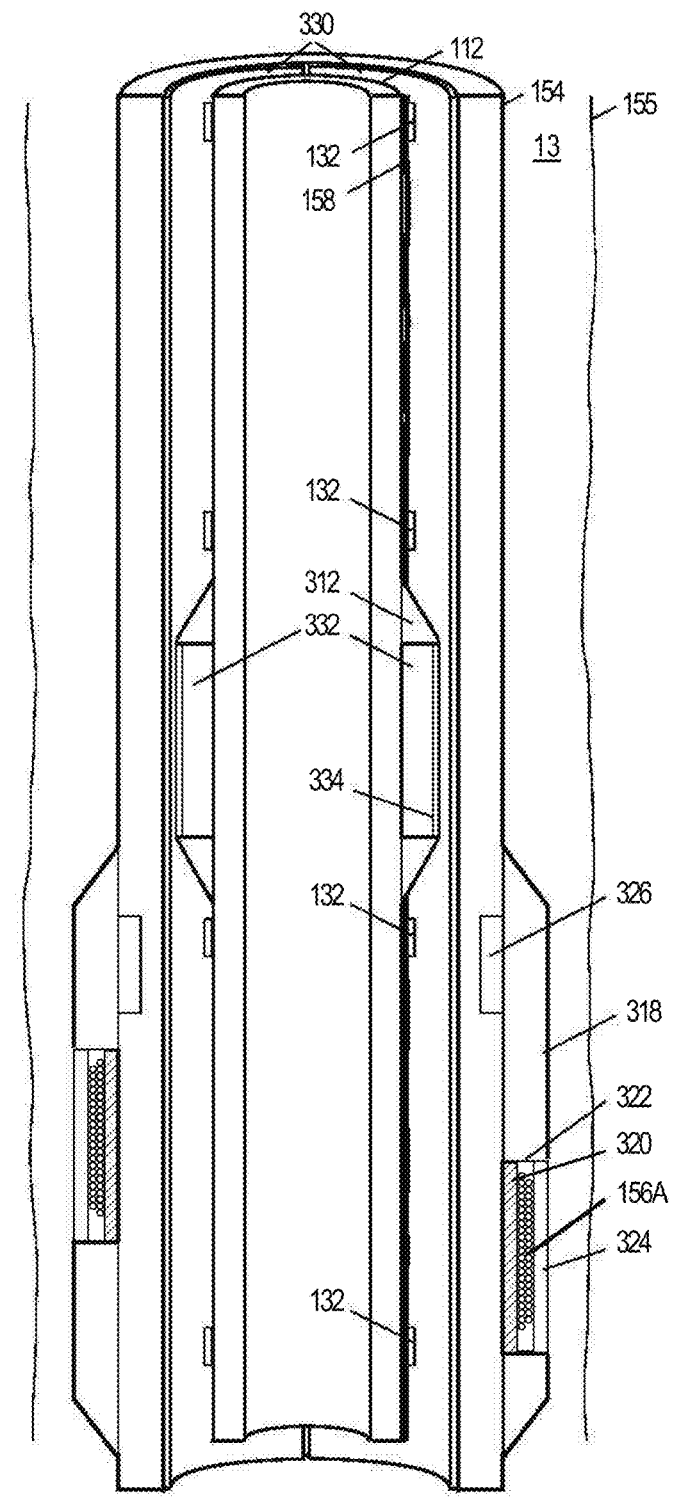
FIG. 4B is a cutaway view showing a downhole scenario involving a transmission crossover arrangement with an electrode-based adapter.

FIG. 4B is a cutaway view showing a downhole scenario involving a transmission crossover arrangement with an electrode-based adapter. In FIG. 4B, the electrode-based adapter corresponds to a set of electrodes 330 on an inner wall of the casing tubular 154. Meanwhile, a set of conductive path electrodes 332 (included as part of the inner conductive path) couple capacitively or galvanically to the inner wall electrodes 330. As shown by the transverse cross section in FIG. 4C, there need not be a one-to-one correspondence between the inner wall electrodes 330 and conductive path electrodes 332. The particular configuration shown in FIG. 4C includes three inner wall electrodes 330A, 330B, 330C, each occupying approximately one-third of the circumference, and two symmetrically arranged conductive path electrodes 332A, 332B each occupying approximately one-sixth of the circumference. The inclusion of extra inner wall electrodes prevents any one inner wall electrode from simultaneously coupling to both conductive path electrodes, enabling the conductive path to operate efficiently regardless of orientation. If wider conductive path electrodes are desired, the number of inner wall electrodes may be increased still further, though this increases the complexity of the signal transference.

The usage of extra inner-wall electrodes may, in at least some instances, mean that signal transference from the conductive path electrodes to the control unit 326 is not trivial. Alternating current (AC) signaling may be employed, and the signals from the three electrodes may be coupled to a two-wire input for the control unit 326 via diodes. Such an approach may be particularly effective for charging an energy storage unit. For communication from the control unit 326 to the conductive path electrodes, a multi-phase (e.g., 3-phase) signaling technique may be employed, driving the inner wall electrodes with signals of different phases (e.g., 120° apart).

For capacitive coupling embodiments, nonconductive material may be placed over each conductive path electrode 332. The inner wall electrodes 330 may be similarly coated. The nonconductive material preferably acts as a passivation layer to protect against corrosion, and where feasible, the passivation layer is kept thin and made from a high-permittivity composition to enhance the capacitive coupling.

In contrast to capacitive coupling, galvanic coupling embodiments make conductor-to-conductor contact between the conductive path electrodes and the inner wall electrodes 330. Resilient supports and scrapers may be employed to clean the electrodes and provide such contact. FIG. 4D shows a transverse cross section of a transmission crossover arrangement having an inner lip 340 that catches and guides adapter key(s) 342 into a channel having electrode 344 to contact matching conductive path electrodes 346 on the keys 342. The keys can be spring biased to press the electrodes together. This configuration supports both galvanic and capacitive coupling techniques, and the one-to-one electrode correspondence simplifies the signal transfer between the conductive path electrodes and the controller 326 or external antennas 156.

FIG. 5 shows an illustrative system employing casing segments with transmission crossover arrangements for guided drilling. Such a system may be employed to drill parallel boreholes suitable for steam assisted gravity drainage (SAGD), intersecting boreholes, or for intersection avoidance in sites having multiple wells. In FIG. 5, a first inductive transmission crossover arrangement 402 responds to a first conductive path 404 along on an internal tubular 112, causing an external antenna 406 of the transmission crossover arrangement 402 to send electromagnetic signals 408. Additionally or alternatively, external antenna 406 receives electromagnetic signals 410 from the bottomhole assembly (BHA) 452 of a drillstring in a nearby borehole 455, and communicates the receive signal (or measurements thereof) to the surface via the conductive path 404.

FIG. 5 also shows a second inductive transmission crossover arrangement 412 with an external antenna 416 to transmit electromagnetic signals 418 in response communications conveyed via the conductive path 414 and/or to receive electromagnetic signals 410 and communicate them to the surface via the conductive path 414. Similar to conductive path 404, the conductive path 414 is mounted to the internal tubular 112. In some embodiments, the conductive paths 404 and 414 correspond to one conductive path. However, it should be appreciated that with careful control of the spacing, any number of conductive paths can be provided for communication with a corresponding number of transmission crossover arrangements.

Figure 6A:
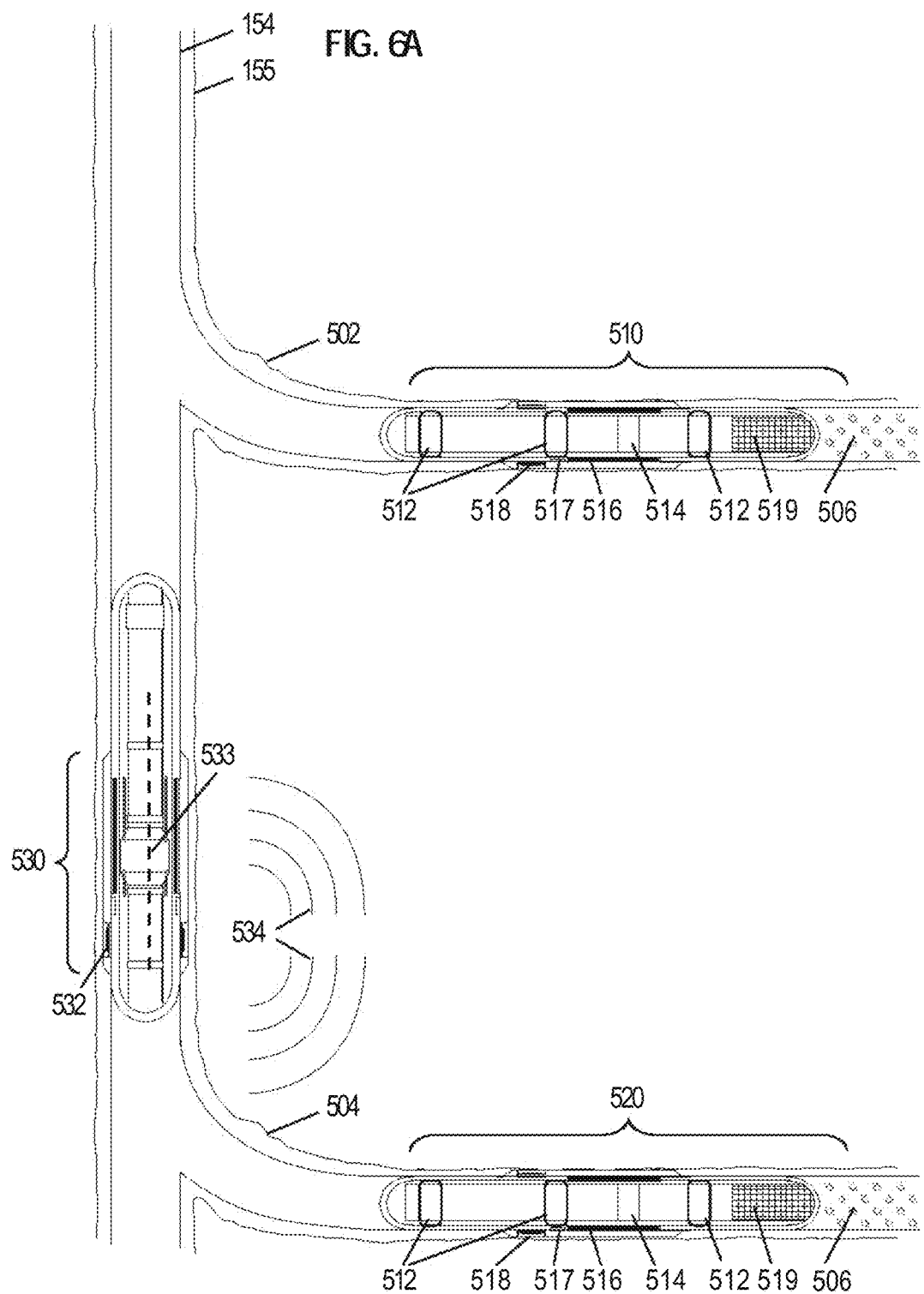
FIG. 6A shows a cased multi-lateral control system employing a casing segment with a transmission crossover arrangement.

FIG. 6A shows an illustrative system employing casing segments with transmission crossover arrangements to provide multilateral production control. The well in FIG. 6A has two, laterally branching, cased boreholes 502, 504 extending from the mother borehole 155. Perforated regions 506 enable formation fluids to enter the lateral boreholes 502, 504, and absent further considerations, flow to the mother borehole 155 and thence to the surface.

To control the flow from the lateral boreholes 502, 504, each is provided with an inflow control device (ICD) 510, 520. The ICD's are equipped with packers 512 that seal the lateral borehole against any flow other than that permitted through inlet 519 by an internal valve. The ICD's are further equipped with a coaxial antenna 514 through which the ICD receives wireless commands to adjust the internal valve setting. In FIG. 6A, the coaxial antenna 514 is placed in an inductive coupling relationship with the outer coil 516 of an inductive transmission crossover arrangement that facilitates communication between the coaxial antenna 514 and an external antenna 518. As with other transmission crossover arrangements described herein, a control unit 517 may mediate the communication.

In the mother borehole 155, one or more transmission crossover arrangements 530 facilitate communication between an external antenna 532 and a conductive path 533, which extends to a surface interface. The surface interface is thus able to employ the external antenna 532 to send electromagnetic signals 534 to the external antennas 518 of the lateral boreholes (to relay the signals to the ICDs 510, 520).

In some embodiments, the ICDs are battery powered and periodically retrieved for servicing and recharging. Another option may be to recharge an ICD battery by conveying EM energy between at least one transmission crossover arrangement and an ICD. The ICDs may be equipped with various sensors for temperature, pressure, flow rates, and fluid properties, which sensor measurements are communicated via the transmission crossover arrangements and external antennas to the conductive path 533 and thence to the surface interface. A computer processing the sensor measurements may determine the appropriate valve settings and communicate them back to the individual ICDs.

Figure 6B:
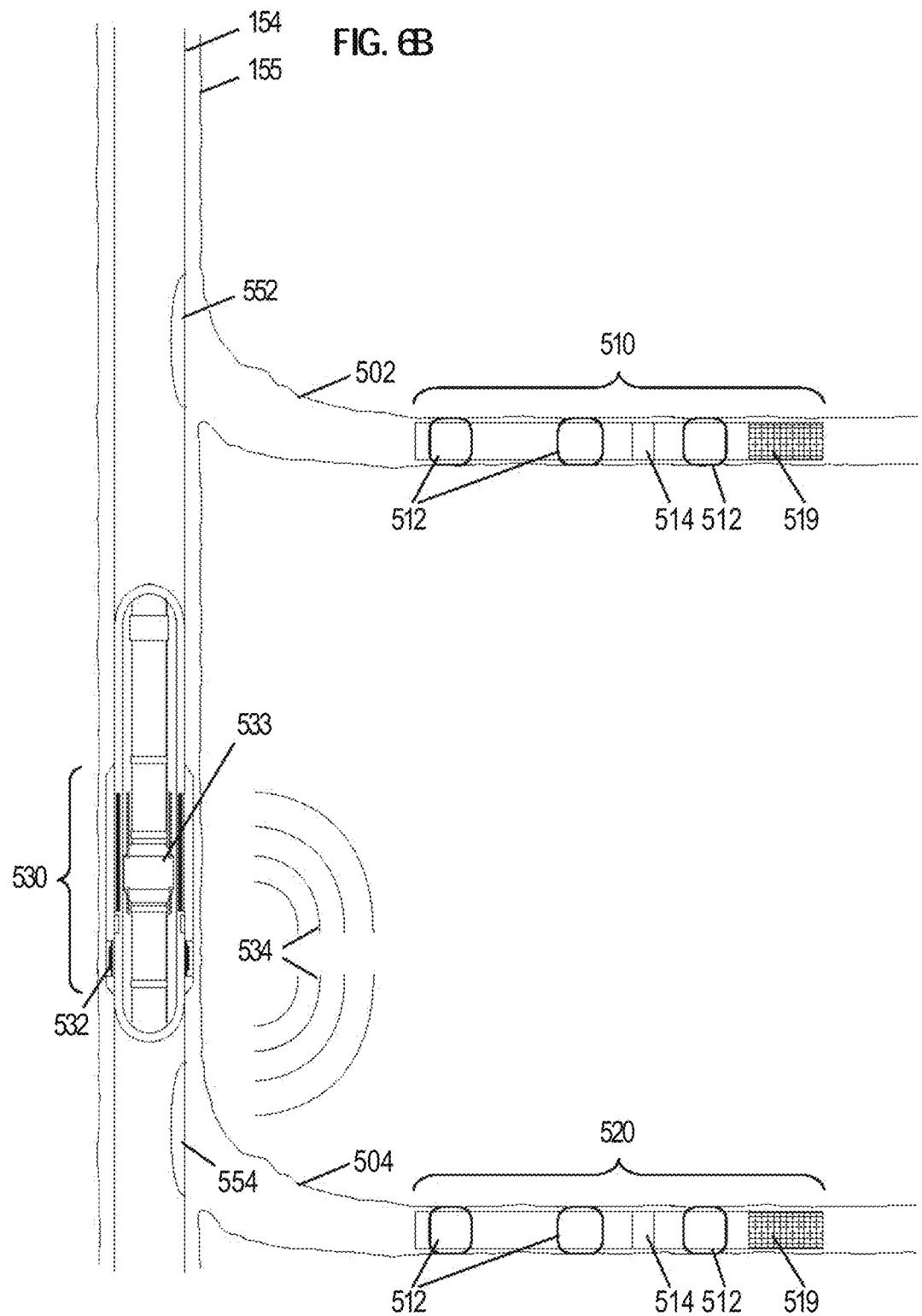
FIG. 6B shows an open-hole multi-lateral control system employing a casing segment with a transmission crossover arrangement.

A similar multilateral production control system is shown in FIG. 6B for open hole laterals. The lateral boreholes are uncased, so the ICDs seal against the borehole walls and regulate flow to ports 552 and 554 in the mother borehole casing 154.

The multilateral systems in FIGS. 7A and 7B are simplified for the purposes of explanation. Meanwhile, FIG. 8 shows a more typical multilateral "fishbone" configuration in which the mother bore 702 is drilled in a mostly vertical fashion until a desired depth is reached, and thereafter steered nearly horizontally along a formation bed. From this nearly horizontal region, lateral "ribs" 704 are drilled horizontally in each direction away from the mother bore in each direction. For SAGD applications, a second such configuration is drilled above or below the first in an essentially parallel arrangement.

Returning to FIGS. 7A and 7B, certain geometrical parameters are defined that are useful for tomographic inversion and fluid front tracking FIG. 7A shows a side view of casing 602 extending along a downwardly-directed casing axis (the Z-axis). A fluid front 604 is shown at a distance D from the receiver location. The front 604 need not be parallel to the casing axis, and in fact FIG. 7A shows the front at a relative dip angle θ (measured from the positive Z axis). FIG. 7B shows an end view of the casing 602, with an X-axis defining a zero-azimuth, which may be the high-side of the borehole or, for a vertical well, may be North. The azimuth angle φ, or "strike", of the front 604 is measured counterclockwise from the X-axis. Similarly, the tilt of the external antennas can also be specified in terms a tilt angle (relative dip) θ and azimuth φ of the antenna axis.

When measurements by multiple sets of external antennas from multiple wells are combined, a more complete understanding of the interwell region can be obtained. Time-domain and/or frequency domain electromagnetic signals can be employed to perform accurate real-time inversion for fluid front tracking, or with sufficient data from multiple transducers and arrays, to perform accurate imaging and tomography of the injection region. The measurements can be repeated to obtain time-lapse monitoring of the injection process. In addition, the conductive tubulars used for nearby drillstrings will make those drillstrings detectable via the electromagnetic signals, enabling them to be guided relative to the existing well(s).

FIG. 7C shows an overhead perspective of a field having an injection fluid front 604 propagating outwards from an injection well 606 towards a producing well 602. Monitoring wells 608, 610 may be provided to enable better monitoring of the front in the region intermediate the injection and producing wells. The positions of the wells and the EM transducers, together with the operating parameters such as transmit signal frequencies, can be chosen using optimization via numerical simulations and/or measurements from LWD and wireline tools during the drilling process. The design parameters are chosen to obtain adequate range and resolution with a minimum cost.

The use of tilted antennas for acquiring measurements from multi-component transmitter and receiver arrangements enables significantly more accurate tomographic and guidance operations to be performed with fewer sets of antennas. In at least some contemplated embodiments, each set of external antenna includes three tilted coil antennas, each tilted by the same amount, but skewed in different azimuthal directions. The azimuthal directions are preferably spaced 120° apart. The amount of tilt can vary, so long as the angle between the antenna axis and the tool axis is greater than zero. Without limitation, contemplated tilts include 30°, 45° and 54.7°. (The latter tilt makes the three antennas orthogonal to each other.) Such tilted coil antennas have been shown to achieve a large lateral sensitivity. Other suitable tilt angles are possible and within the scope of the present disclosure.

FIG. 9A is a flow diagram of an illustrative interwell tomography method that, after the initial setup steps, may be at least partly carried out by a processor in communication with one or more of the surface interface systems. In block 802, a crew drills an initial borehole. In block 804, the crew assembles a casing string with at least one set of transmission crossover arrangements and inserts it in the borehole. Some systems may employ multiple transmission crossover arrangements, each having a respective set of external antennas. The crew may cement the casing string in place for permanent installation.

In block 806, the crew deploys a conductive path (e.g., a cable along an inner tubular or a wireline service tool) inside the casing string. As described herein, inductive coils or electrodes are employed along the conductive path to couple to transmission crossover arrangement adapters along the casing string. According, the conductive path supports the delivery of power and/or telemetry to each transmission crossover arrangement. The positioning of the inner tubular or wireline can be adjusted (to adjust inductive coils or electrodes along the conductive path) until suitable coupling has been achieved with each transmission crossover arrangement adapter.

In block 808, the crew drills one or more additional boreholes, and in block 810 the crew equips each of the additional boreholes with one or more sets of antennas. Such antennas may be external casing antennas as used in the initial borehole, or they make take some other form such as an open hole wireline sonde. Additional antennas may also be deployed at the surface.

In block 812, the processor employs the conductive path and transmission crossover arrangements to acquire measurements of the designated receive antenna responses to signals from each of the designated transmit antennas. The external antennas corresponding to the transmission crossover arrangements can function in either capacity or in both capacities. In addition to some identification of the measurement time and the associated transmit and receive antennas, the signal measurements may include signal strength (e.g., voltage), attenuation, phase, travel time, and/or receive signal waveform. The processor unit optionally triggers the transmitters, but in any event obtains responsive measurements from the receivers. Some systems embodiments may employ transient or ultra-wideband signals.

In block 814, the processor unit performs initial processing to improve the signal-to-noise ratio of the measurements, e.g., by dropping noisy or obviously erroneous measurements, combining measurements to compensate for calibration errors, demodulating or otherwise filtering signal waveforms to screen out-of-band noise, and/or averaging together multiple measurements.

In addition, the processor may apply a calibration operation to the measurements. One particular example of a calibration operation determines the ratio of complex voltage or current signals obtained at two different receivers, or equivalently, determines the signal phase differences or amplitude ratios.

In block 816, the processor unit performs an inversion to match the measurements with a synthetic measurements from a tomographic formation model. The model parameters may include a distribution of formation resistivity R and/or permittivity as a function of distance, dip angle, and azimuth from a selected transmitter or receiver. Where a sufficient number of independent measurements are available (e.g. measurements at additional receivers, frequencies, and/or from different wells), the model parameters may include the relative positions and orientations of nearby tubulars such as drillstrings or the casings of different wells.

In block 818, the processor unit provides to a user a display having a representation of the derived model parameter values. The display may include a graphical representation of the resistivity and/or permittivity distribution throughout a two or three dimensional volume. Alternative representations include numeric parameter values, or a two-dimensional log of each parameter value as a function of time.

In block 820, the processor unit combines the current parameter values with past parameter values to derive changes in the resistivity or permittivity distribution, which may indicate the motion of a fluid front. These parameter values may be similarly displayed to the user.

In block 822, the processor unit may automatically adjust a control signal or, in an alternative embodiment, display a control setting recommendation to a user. For example, if a fluid front has approached closer than desired to the producing well, the processor unit may throttle down or recommend throttling down a flow valve to reduce the production rate or the injection rate. Where multiple injection or production zones are available, the system may redistribute the available production and injection capacity with appropriate valve adjustments to keep the front's approach as uniform as possible. Blocks 812-822 are repeated to periodically obtain and process new measurements.

FIG. 9B is a flow diagram of an illustrative guided drilling method. Blocks representing similar operations in the previous method are similarly numbered and not described further here. In block 824, the additional borehole(s) are drilled with a steerable drillstring that optionally has a bottom hole assembly with antennas to transmit or receive signals from external casing antennas corresponding to at least one transmission crossover arrangement in the initial well. In block 826, distance or direction measurements are used to triangulate a position and to derive, in combination with previous measurements, a trajectory. The settings adjustment in block 822 represents the steering operations that are undertaken in response to the position and trajectory measurements to steer the drillstring along a desired course relative to the initial borehole.

In certain alternative embodiments, the transmission crossover arrangements are employed to generate beacon signals from each of the external casing antennas. The drillstring BHA measures the beacon signals and optionally determines a distance and direction to each beacon, from which a position and desired direction can be derived. In other embodiments, the BHA employs a permanent magnet that rotates to generate an electromagnetic signal that can be sensed by the external casing antennas. In still other embodiments, the external casing antennas merely detect the presence of the conductive drillstring from the changes it causes in the resistivity distribution around the initial well.

FIG. 9C is a flow diagram of an illustrative multilateral control method. Blocks representing similar operations in the previous methods are similarly numbered and not described further here. In block 830, the crew drills lateral boreholes extending from the mother borehole. In optional block 832, the crew assembles a lateral casing string with at least one transmission crossover arrangement and inserts it in the lateral borehole.

In block 834, the crew deploys an ICD in each lateral borehole, setting it with one or more packers to secure it in place. Each ICD includes an internal valve that can be adjusted via wireless commands to a coaxial ICD antenna coil. Blocks 830, 832, 834 preferably precede the deployment of an inner tubular or wireline adapter in block 806.

In block 836, the processor unit communicates with each ICD via the conductive path and one or more transmission crossover arrangements to establish suitable valve settings. In block 838, the processor unit collects and processes various sensor measurements optionally including measurements from sensors in the ICDs themselves. In any event, flow rates and fluid compositions at the wellhead should be measured. In block 822, the processor unit determines whether any adjustments are necessary, and if so, communicates them to the individual ICDs. Blocks 836, 838, and 822 may form a loop that is periodically repeated.

Embodiments disclosed herein include:

A: An interwell tomography method that comprises casing a first borehole with a casing tubular having at least one transmission crossover arrangement, each transmission crossover arrangement having an adapter in communication with a coil antenna that encircles an exterior of the casing tubular. The method also comprises deploying, inside the casing tubular, a conductive path that extends from a surface interface to the at least one transmission crossover arrangement. The method also comprises providing a set of one or more antennas in a second borehole. The method also comprises obtaining EM measurements for interwell tomography using the at least one transmission crossover arrangement and the set of one or more antennas, where obtaining the EM measurements involves conveying data or power between the at least one transmission crossover arrangement and the surface interface via the conductive path.

B: An interwell tomography system that comprises a downhole casing tubular deployed in a first borehole and having at least one transmission crossover arrangement, each transmission crossover arrangement having an adapter in communication with a coil antenna that encircles an exterior of the casing tubular. The system also comprises a conductive path, deployed inside the casing tubular, that extends from a surface interface to the at least one transmission crossover arrangement. The system also comprises a set of one or more antennas in a second borehole, wherein the set of one or more antennas and the least one transmission crossover arrangement obtain EM measurements for interwell tomography, and wherein obtaining the EM measurements involves conveying data or power between the at least one transmission crossover arrangement and the surface interface via the conductive path. The system also comprises a processing unit that derives at least one characteristic of a region between the first and second boreholes based on the obtained EM measurements.

Each of the embodiments, A and B, may have one or more of the following additional elements in any combination. Element 1: further comprising displaying a visual representation of a region between the first and second boreholes based on the obtained EM measurements. Element 2: wherein obtaining the EM measurements comprises conveying transmission signals from the surface interface to the at least one transmission crossover arrangement via the conductive path. Element 3: wherein obtaining EM measurements comprises conveying EM measurements from the at least one transmission crossover arrangement to the surface interface via the conductive path. Element 4: wherein each transmission crossover arrangement further comprises a control unit, each control unit having circuitry to handle EM transmissions by a respective coil antenna and having an energy storage device that receives power from the surface interface via the conductive path and a respective adapter. Element 5: wherein each transmission crossover arrangement further comprises a control unit, each control unit having circuitry to handle EM measurements acquired by a respective coil antenna, a data storage unit to store the EM measurements, and an energy storage device to power the data storage unit, wherein the energy storage device receives power from the surface interface via the conductive path and a respective adapter. Element 6: wherein the casing tubular has multiple, axially-spaced transmission crossover arrangements. Element 7: wherein at least one coil antenna corresponding to the at least one transmission crossover arrangement is tilted. Element 8: wherein deploying the conductive path comprises attaching a cable to an inner tubular and lowering the inner tubular into the casing tubular. Element 9: wherein deploying the conductive path comprises lowering a wireline service tool into the casing tubular. Element 10: wherein each adapter couples to the conductive path via inductive coupling. Element 11: wherein each adapter couples to the conductive path via galvanic or capacitive coupling. Element 12: wherein at least one of the first and second boreholes is horizontal. Element 13: wherein the first and second boreholes are laterals from a multilateral well. Element 14: further comprising processing the obtained EM measurements to derive an interwell resistivity, permittivity, porosity, or fluid concentration.

Element 15: further comprising a monitor in communication with the processing unit, wherein the monitor displays a visual representation of the region based on the obtained EM measurements. Element 16: wherein the conductive path conveys transmission signals from the surface interface to the at least one transmission crossover arrangement. Element 17: wherein the conductive path conveys EM measurements acquired by the at least one transmission crossover arrangement to the surface interface. Element 18: wherein the casing tubular has multiple, axially-spaced transmission crossover arrangements. Element 19: wherein each transmission crossover arrangement further comprises a control unit, each control unit having circuitry to handle EM transmissions by a respective coil antenna and having an energy storage device that receives power from the surface interface via the conductive path and a respective adapter. Element 20: wherein each transmission crossover arrangement further comprises a control unit, each control unit having circuitry to handle EM measurements acquired by a respective coil antenna, a data storage unit to store the EM measurements, and an energy storage device to power the data storage unit, wherein the energy storage device receives power from the surface interface via the conductive path and a respective adapter. Element 21: wherein at least one coil antenna corresponding to the at least one transmission crossover arrangement is tilted. Element 22: wherein the conductive path comprises a cable attached to an inner tubular and lowered into the casing tubular. Element 23: wherein the conductive path comprises a wireline service tool lowered into the casing tubular. Element 24: wherein each adapter couples to the conductive path via inductive coupling. Element 25: wherein each adapter couples to the conductive path via galvanic or capacitive coupling.

Numerous variations and modifications will become apparent to those skilled in the art once the above disclosure is fully appreciated. For example, the foregoing disclosure focuses on the use of tilted and untilted magnetic dipole antennas, but the disclosed principles are applicable to external casing elements employing other transducer types including multicomponent electric dipoles and further including various magnetic field sensors such as fiberoptic sensors, MEMS sensors, and atomic magnetometers. As another example, the casing tubular need not provide a transmission crossover arrangement for each external element, but rather may have an array of longitudinally-spaced external elements that couple to a shared control unit and/or adapter. Array communications may be provided using an external cable or wireless near field communications.

As yet another example, the use of transmission crossover arrangements is not limited to casing, but rather may be employed for any pipe-in-pipe system including those wells employing multiple concentric production tubulars and those drilling systems employing concentric drilling tubulars. Further, it should be appreciated that surface interface components need not be at earth's surface in order to function. For example, one or more surface interface components may be below earth's surface and uphole relative to the transmission crossover arrangements being used. In subsea scenarios, surface interface components (or a corresponding unit) may be deployed, for example, along a seabed to provide an interface for transmission crossover arrangements deployed in a well that extends below the seabed. It is intended that, where applicable, the claims be interpreted to embrace all such variations and modifications.

What is claimed is:

1. An interwell tomography method that comprises:
   casing a first borehole with a casing tubular lining a wall of the first borehole and having at least one transmission crossover arrangement, each transmission crossover arrangement having an adapter in communication with a coil antenna that encircles an exterior of the casing tubular;
   deploying, inside the casing tubular, a conductive path that extends from a surface interface to the at least one transmission crossover arrangement;
   providing a set of one or more antennas in a second borehole, wherein the set of one or more antennas in the second borehole are part of a bottomhole assembly of a drill string that is to drill the second borehole;
   collecting a first set of electromagnetic (EM) measurements using the at least one transmission crossover arrangement based on a first EM field emitted from the set of one or more antennas by conveying data or power between the at least one transmission crossover arrangement and the surface interface via the conductive path;
   collecting a second set of EM measurements using the set of one or more antennas based on a second EM field emitted by the at least one transmission crossover arrangement; and
   determining a formation parameter based on the first set of EM measurements and the second set of EM measurements.

2. The method of claim 1, wherein collecting the first set of EM measurements comprises conveying transmission signals from the surface interface to the at least one transmission crossover arrangement via the conductive path.

3. The method of claim 1, wherein collecting the first set of EM measurements comprises conveying the first set of EM measurements from the at least one transmission crossover arrangement to the surface interface via the conductive path.

4. The method of claim 1, wherein each transmission crossover arrangement further comprises a control unit, each control unit having circuitry to handle EM transmissions by a respective coil antenna and having an energy storage device that receives power from the surface interface via the conductive path.

5. The method of claim 1, wherein each transmission crossover arrangement further comprises a control unit, each control unit having circuitry to handle the first set of EM measurements acquired by a respective coil antenna, a data storage unit to store the EM measurements, and an energy storage device to power the data storage unit, wherein the energy storage device receives power from the surface interface via the conductive path.

6. The method of claim 1, wherein the casing tubular has multiple, axially-spaced transmission crossover arrangements.

7. The method of claim 1, wherein at least one coil antenna corresponding to the at least one transmission crossover arrangement is tilted.

8. The method of claim 1, wherein deploying the conductive path comprises attaching a cable to an inner tubular and lowering the inner tubular into the casing tubular.

9. The method of claim 1, wherein deploying the conductive path comprises lowering a wireline service tool into the casing tubular.

10. The method of claim 1, wherein each adapter couples to the conductive path via inductive coupling.

11. The method of claim 1, wherein each adapter couples to the conductive path via galvanic or capacitive coupling.

12. The method of claim 1, wherein the first and second boreholes are laterals from a multilateral well.

13. The method of claim 1, further comprising processing the collected first and second set of EM measurements to derive an interwell resistivity, permittivity, porosity, or fluid concentration.

14. The method of claim 1, wherein the casing of the first borehole is performed after drilling the first borehole.

15. The method of claim 1, wherein the formation parameter is a fluid parameter.

16. An interwell tomography system that comprises:
    a downhole casing tubular deployed to line a wall of a first borehole and having at least one transmission crossover arrangement, each transmission crossover arrangement having an adapter in communication with a coil antenna that encircles an exterior of the casing tubular;
    a conductive path, deployed inside the casing tubular, that extends from a surface interface to the at least one transmission crossover arrangement;
    a set of one or more antennas in a second borehole, wherein the at least one transmission crossover arrangement collects a first set of electromagnetic (EM) measurements for interwell tomography based on a first EM field emitted from the set of one or more antennas, and wherein the set of one or more antennas in the second borehole are part of a bottomhole assembly of a drill string that is to drill the second borehole, and wherein collecting the first set of EM measurements involves conveying data or power between the at least one transmission crossover arrangement and the surface interface via the conductive path, and wherein the set of one or more antennas collect a second set of EM measurements using the set of one or more antennas based on a second EM field emitted by the at least one transmission crossover arrangement; and a processing unit that derives at least one characteristic of a region between the first and second boreholes based on the first set of EM measurements and the second set of EM measurements.

17. The system of claim 16, wherein the conductive path conveys transmission signals from the surface interface to the at least one transmission crossover arrangement.

18. The system of claim 16, wherein the conductive path conveys the collected first set of EM measurements acquired by the at least one transmission crossover arrangement to the surface interface.

19. The system of claim 16, wherein the casing tubular has multiple, axially-spaced transmission crossover arrangements.

20. The system of claim 16, wherein each transmission crossover arrangement further comprises a control unit, each control unit having circuitry to handle EM transmissions by a respective coil antenna and having an energy storage device that receives power from the surface interface via the conductive path.

21. The system of claim 16, wherein each transmission crossover arrangement further comprises a control unit, each control unit having circuitry to handle the first set of EM measurements acquired by a respective coil antenna, a data storage unit to store the first set of EM measurements, and an energy storage device to power the data storage unit, wherein the energy storage device receives power from the surface interface via the conductive path.

22. The system of claim 16, wherein at least one coil antenna corresponding to the at least one transmission crossover arrangement is tilted.

23. The system of claim 16, wherein the conductive path comprises a cable attached to an inner tubular and lowered into the casing tubular.

24. The system of claim 16, wherein each adapter couples to the conductive path via inductive coupling.

25. The system of claim 16, wherein each adapter couples to the conductive path via galvanic or capacitive coupling.

26. The system of claim 16, wherein the downhole casing tubular is deployed to line the wall of the first borehole after the first borehole is drilled.

27. An interwell tomography method that comprises:

casing a first borehole with a casing tubular lining a wall of the first borehole and having at least one transmission crossover arrangement, each transmission crossover arrangement having an adapter in communication with a coil antenna that encircles an exterior of the casing tubular;

deploying, inside the casing tubular, a conductive path that extends from a surface interface to the at least one transmission crossover arrangement;

providing a set of one or more antennas in a second borehole;

collecting a first set of electromagnetic (EM) measurements using the at least one transmission crossover arrangement based on a first EM field emitted from the set of one or more antennas by conveying data or power between the at least one transmission crossover arrangement and the surface interface via the conductive path;

collecting a second set of EM measurements using the set of one or more antennas based on a second EM field emitted by the at least one transmission crossover arrangement; and determining a fluid front distance based on the first set of EM measurements and the second set of EM measurements for interwell tomography.

28. The method of claim 27, wherein collecting the first set of EM measurements comprises conveying transmission signals from the surface interface to the at least one transmission crossover arrangement via the conductive path.

* * * * *